(12) United States Patent
Herren

(10) Patent No.: US 8,635,948 B2
(45) Date of Patent: Jan. 28, 2014

(54) DEVICE FOR PROCESSING FOODSTUFFS

(75) Inventor: Bruno Herren, Beckenried (CH)

(73) Assignee: swizzzProzzz AG (CH)

( * ) Notice: Subject to any disclaimer, the term of this patent is extended or adjusted under 35 U.S.C. 154(b) by 838 days.

(21) Appl. No.: 12/299,436

(22) PCT Filed: May 3, 2007

(86) PCT No.: PCT/CH2007/000217
§ 371 (c)(1),
(2), (4) Date: Nov. 3, 2008

(87) PCT Pub. No.: WO2007/128153
PCT Pub. Date: Nov. 15, 2007

(65) Prior Publication Data
US 2009/0090254 A1 Apr. 9, 2009

(30) Foreign Application Priority Data
May 4, 2006 (CH) .......................... 730/06

(51) Int. Cl.
A47J 43/07 (2006.01)
A23N 4/00 (2006.01)
B02C 18/08 (2006.01)
A47J 43/044 (2006.01)
A47J 43/046 (2006.01)
A47J 23/00 (2006.01)

(52) U.S. Cl.
CPC .............. *A47J 43/044* (2013.01); *A47J 43/046* (2013.01); *A47J 23/00* (2013.01)
USPC .... 99/537; 241/169.2; 241/199.2; 241/199.3; 241/199.7; 241/199.9; 241/199.11; 241/199.12

(58) Field of Classification Search
CPC ........ A47J 43/044; A47J 43/046; A47J 23/00
USPC ........ 99/537; 241/169.1, 199.2, 199.3, 199.7, 241/199.9, 199.11, 199.12
See application file for complete search history.

(56) References Cited

U.S. PATENT DOCUMENTS 2,649,882 A * 8/1953 Chopieska .................. 241/292.1
2,918,956 A * 12/1959 Otto ................................ 241/97

(Continued)

FOREIGN PATENT DOCUMENTS

CN  2277231 Y  4/2008
DE  296 12 865  10/1996

(Continued)

OTHER PUBLICATIONS

International Search Report dated Aug. 2, 2007, issued in corresponding international application No. PCT/CH2007/000217.

*Primary Examiner* — Gene Kim
*Assistant Examiner* — Alexander Niconovich
(74) *Attorney, Agent, or Firm* — Ostrolenk Faber LLP

(57) ABSTRACT

The present disclosure relates to a working unit or a device that includes a working unit of this type for processing foodstuffs. The working unit can be driven and made to rotate by means of a drive unit of said device. The working unit preferably has at least two working elements that are situated on a working axis and that act in the peripheral direction of said working axis. At least one of the working elements can be pivoted about the working axis in relation to at least one additional working element within a restricted pivoting angle. The pivoting mobility of the blades, which are preferably interspaced and positioned axially one above the other, permits said blades to be brought into a common radial resting position in order to fill the container with the product to be cut, in such a way that practically the entire container volume is exposed and can be filled. The pivoting mobility of the second blade on the bearing axis allows the initial expenditure of energy to be significantly reduced in the start phase, as not all the blades are required to start cutting simultaneously.

26 Claims, 20 Drawing Sheets

(56) References Cited

U.S. PATENT DOCUMENTS

| | | | | | |
|---|---|---|---|---|---|
| 3,156,278 | A | * | 11/1964 | Otto | 241/282.2 |
| 3,172,442 | A | * | 3/1965 | Otto | 241/282.2 |
| 3,313,332 | A | * | 4/1967 | Otto et al. | 241/98 |
| 3,434,518 | A | * | 3/1969 | Motis | 241/199.12 |
| 3,493,022 | A | * | 2/1970 | Mantelet | 241/199.12 |
| 3,741,104 | A | * | 6/1973 | Kannegiesser | 99/495 |
| 3,892,365 | A | * | 7/1975 | Verdun | 241/92 |
| 3,957,215 | A | * | 5/1976 | Otto et al. | 241/282.1 |
| 4,100,612 | A | * | 7/1978 | Hoover et al. | 366/143 |
| 4,100,613 | A | * | 7/1978 | Shaeffer | 366/143 |
| 4,100,615 | A | * | 7/1978 | Thompson | 366/170.2 |
| 4,101,977 | A | * | 7/1978 | Brackman | 366/246 |
| 4,101,978 | A | * | 7/1978 | Brackman | 366/314 |
| 4,106,118 | A | * | 8/1978 | Hoover | 336/185 |
| 4,124,310 | A | * | 11/1978 | Brackman et al. | 366/314 |
| 4,127,342 | A | * | 11/1978 | Coggiola | 403/243 |
| 4,173,310 | A | * | 11/1979 | Schaeffer | 241/282.1 |
| 4,176,527 | A | | 12/1979 | Linstromberg et al. | 62/320 |
| 4,200,244 | A | * | 4/1980 | Sontheimer | 241/282.1 |
| 4,219,318 | A | * | 8/1980 | Cavalli | 425/190 |
| RE30,649 | E | * | 6/1981 | Thompson | 366/170.2 |
| 4,283,979 | A | * | 8/1981 | Rakocy et al. | 83/666 |
| 4,331,300 | A | * | 5/1982 | Hicks et al. | 241/282.1 |
| 4,741,483 | A | * | 5/1988 | Damm et al. | 241/46.17 |
| 4,752,041 | A | * | 6/1988 | Franke et al. | 241/282.1 |
| 4,863,278 | A | * | 9/1989 | Otto | 366/143 |
| 4,878,627 | A | * | 11/1989 | Otto | 241/199.12 |
| 4,891,966 | A | * | 1/1990 | Kramer | 73/19.01 |
| 4,955,548 | A | * | 9/1990 | Rahill | 241/30 |
| 4,955,724 | A | * | 9/1990 | Otto | 366/314 |
| 5,044,763 | A | * | 9/1991 | Otto | 366/309 |
| 5,156,084 | A | * | 10/1992 | Lin | 99/495 |
| 5,176,329 | A | | 1/1993 | De Coster et al. | |
| 5,360,170 | A | * | 11/1994 | Cartellone | 241/169.1 |
| 5,486,100 | A | * | 1/1996 | Hsu | 425/190 |
| 5,577,675 | A | * | 11/1996 | Ishikawa | 241/65 |
| 5,735,193 | A | * | 4/1998 | Chang | 99/494 |
| 5,782,416 | A | * | 7/1998 | Nejatbina | 241/194 |
| 5,921,485 | A | * | 7/1999 | Plavcan et al. | 241/282.2 |
| 5,996,483 | A | * | 12/1999 | Yip | 99/628 |
| 6,035,771 | A | * | 3/2000 | Conran et al. | 99/510 |
| 6,298,776 | B1 | * | 10/2001 | Ekstrom | 99/509 |
| 6,299,085 | B1 | * | 10/2001 | Ekstrom | 241/282.1 |
| 6,312,246 | B1 | * | 11/2001 | Pozzobon | 425/190 |
| 6,340,124 | B1 | * | 1/2002 | Charles et al. | 241/37.5 |
| 6,397,735 | B1 | * | 6/2002 | Wong | 99/492 |
| 6,467,711 | B2 | * | 10/2002 | Michel | 241/169 |
| 6,494,392 | B1 | * | 12/2002 | Vedefors | 241/56 |
| D480,613 | S | * | 10/2003 | Wong | D7/693 |
| 6,709,150 | B2 | * | 3/2004 | Lin | 366/199 |
| 6,805,312 | B2 | * | 10/2004 | Capp | 241/36 |
| 6,814,323 | B2 | * | 11/2004 | Starr et al. | 241/282.2 |
| 6,848,638 | B2 | * | 2/2005 | Yin et al. | 241/282.1 |
| 6,932,503 | B2 | * | 8/2005 | Fallowes | 366/309 |
| 7,059,553 | B2 | * | 6/2006 | Mueller | 241/199.12 |
| 7,264,189 | B2 | * | 9/2007 | Holcomb et al. | 241/101.1 |
| 7,422,169 | B2 | * | 9/2008 | Mueller | 241/168 |
| 7,669,793 | B2 | * | 3/2010 | So et al. | 241/169.1 |
| 7,673,829 | B2 | * | 3/2010 | Holcomb et al. | 241/292.1 |
| 7,762,487 | B2 | * | 7/2010 | Cheung | 241/169.1 |
| 7,905,438 | B2 | * | 3/2011 | Holcomb et al. | 241/292.1 |
| 7,954,744 | B2 | * | 6/2011 | Jossem et al. | 241/169.1 |
| 2002/0027175 | A1 | * | 3/2002 | Capp | 241/199.12 |
| 2008/0163768 | A1 | * | 7/2008 | Glucksman et al. | 99/537 |
| 2009/0090254 | A1 | | 4/2009 | Herren | |
| 2009/0178580 | A1 | * | 7/2009 | Herren | 99/510 |
| 2009/0320696 | A1 | * | 12/2009 | Herren | 99/493 |
| 2010/0170404 | A1 | * | 7/2010 | Hensel et al. | 99/537 |

FOREIGN PATENT DOCUMENTS

| | | |
|---|---|---|
| DE | 29612865 | 11/1996 |
| EP | 0 345 223 | 5/1999 |
| EP | 1 034 731 | 9/2000 |
| EP | 1034731 | 9/2000 |
| FR | 2 603 221 | 3/1988 |
| FR | 2603221 | 3/1988 |
| GB | 982 050 | 2/1965 |
| GB | 982050 | 2/1965 |
| JP | 55158017 | 12/1980 |
| JP | 62138089 | 6/1987 |
| JP | 2002360452 | 12/2002 |
| TW | 448758 Y | 8/2001 |
| WO | 03/057355 | 7/2003 |

\* cited by examiner

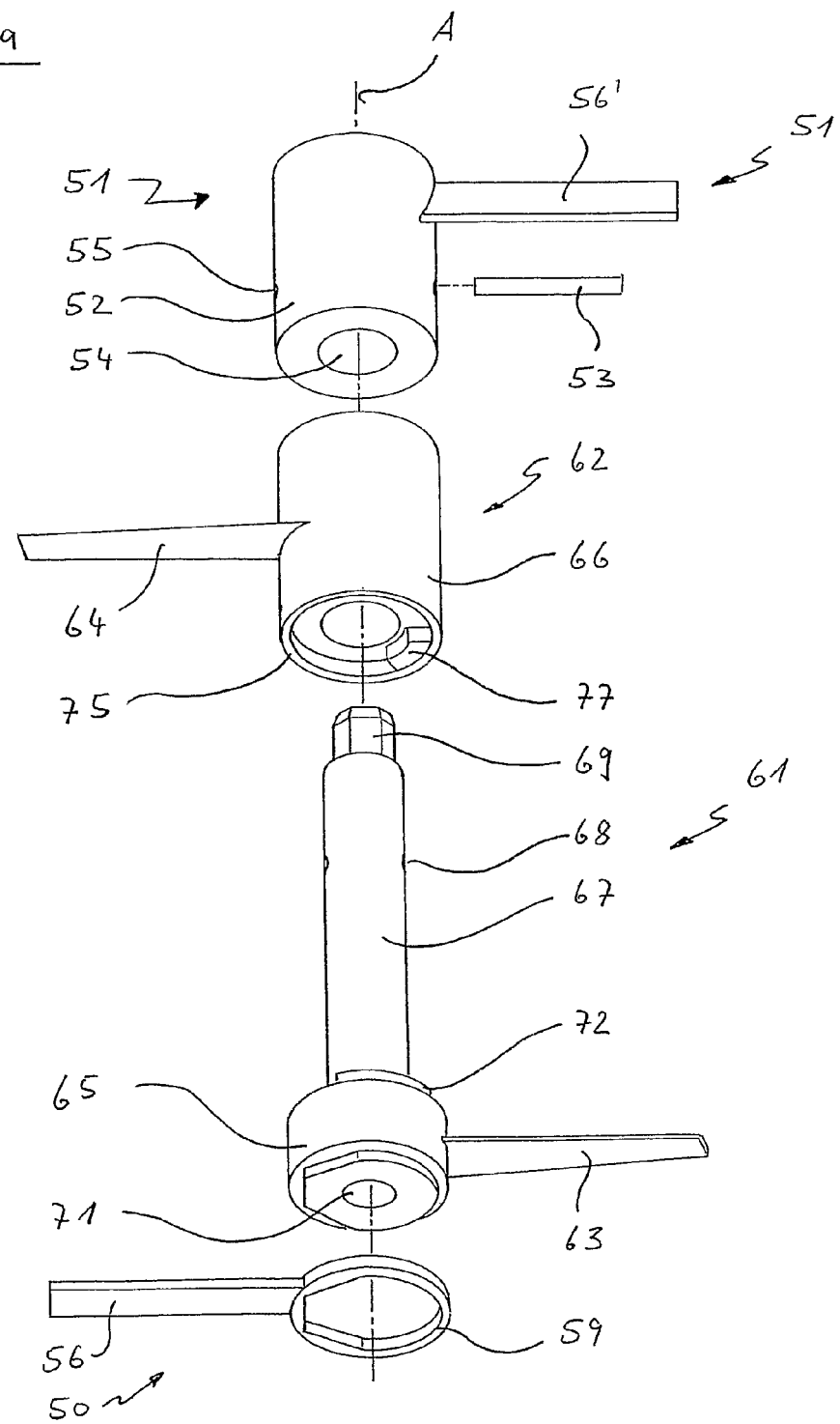

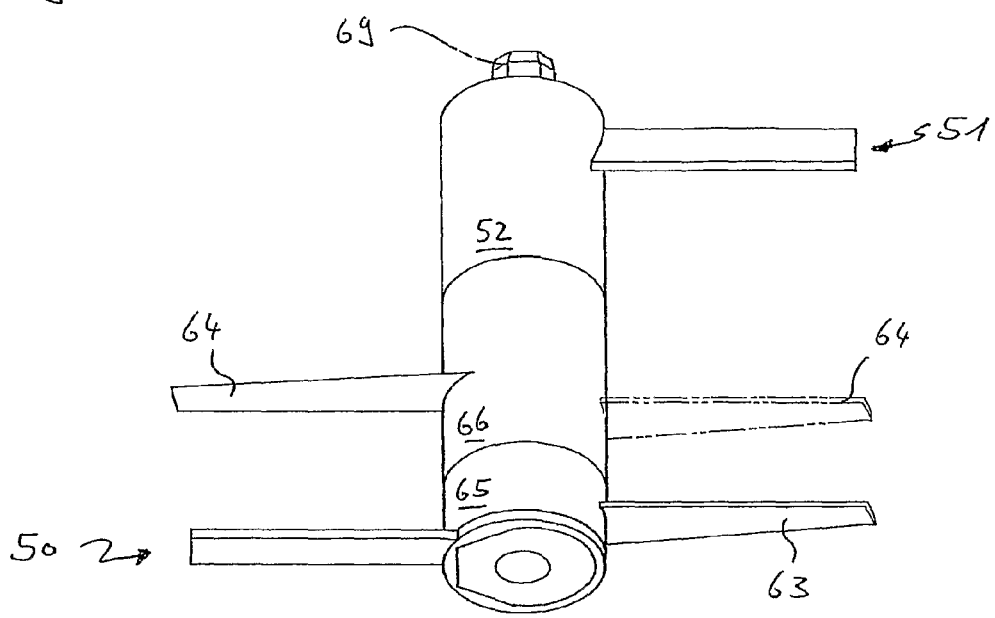
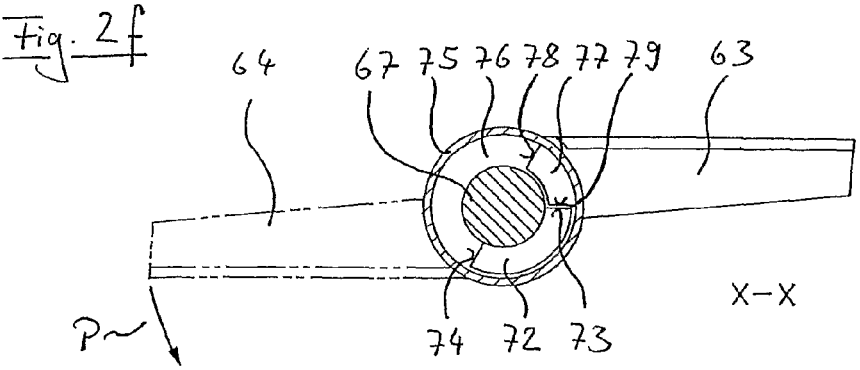
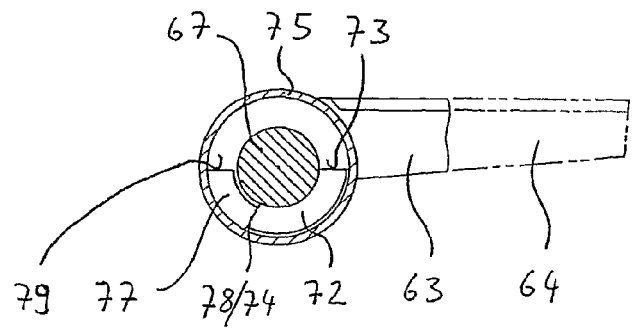

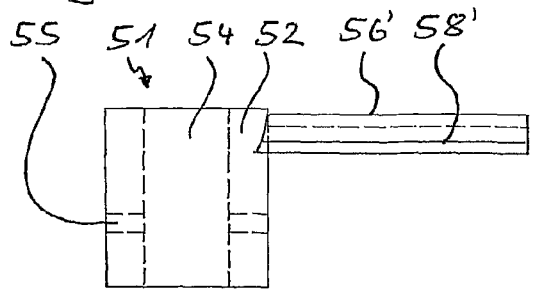
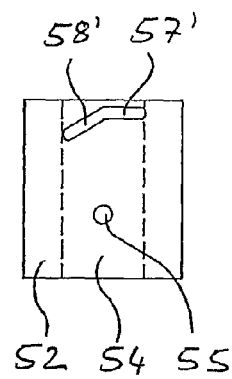
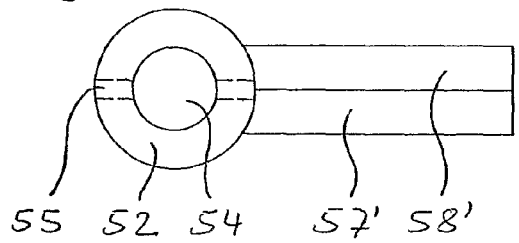
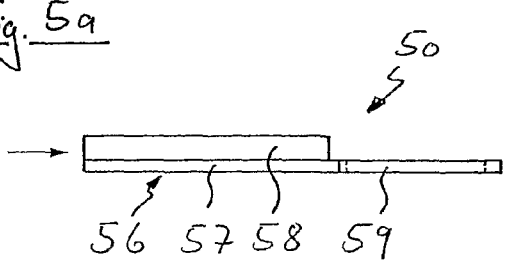
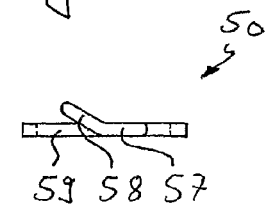
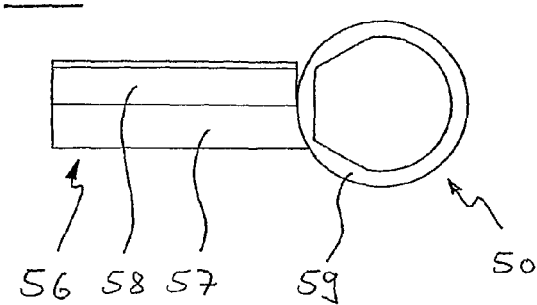

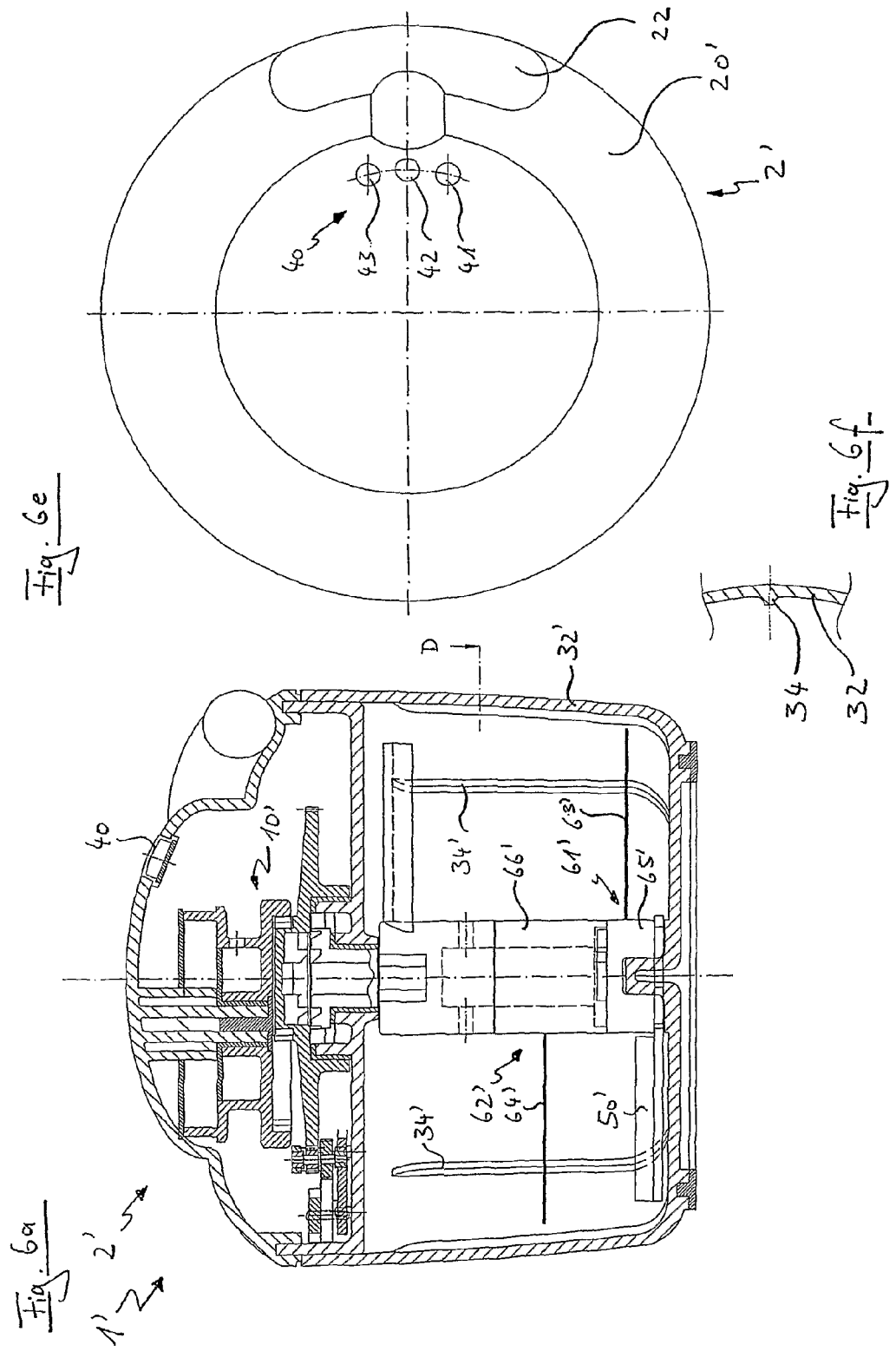

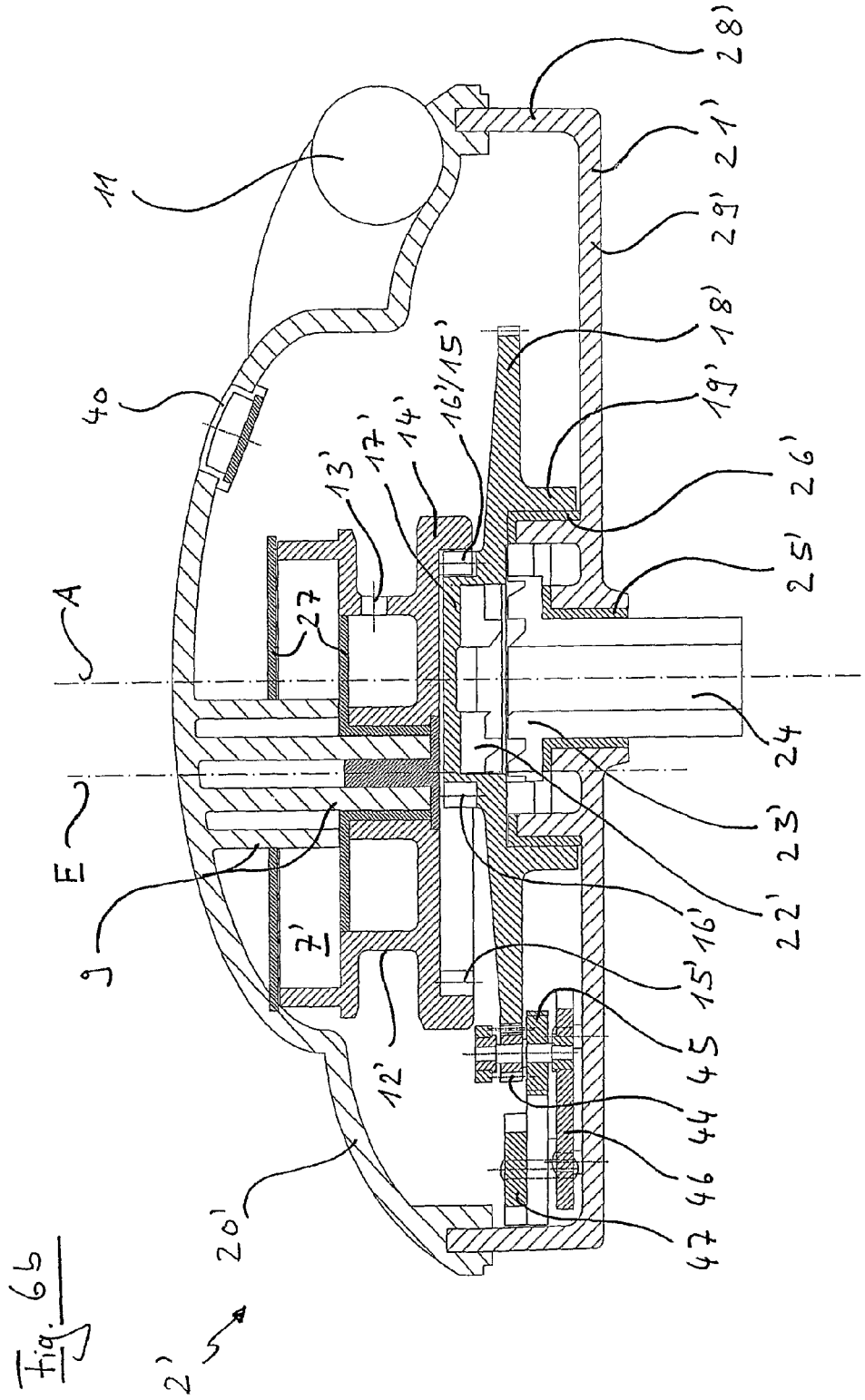

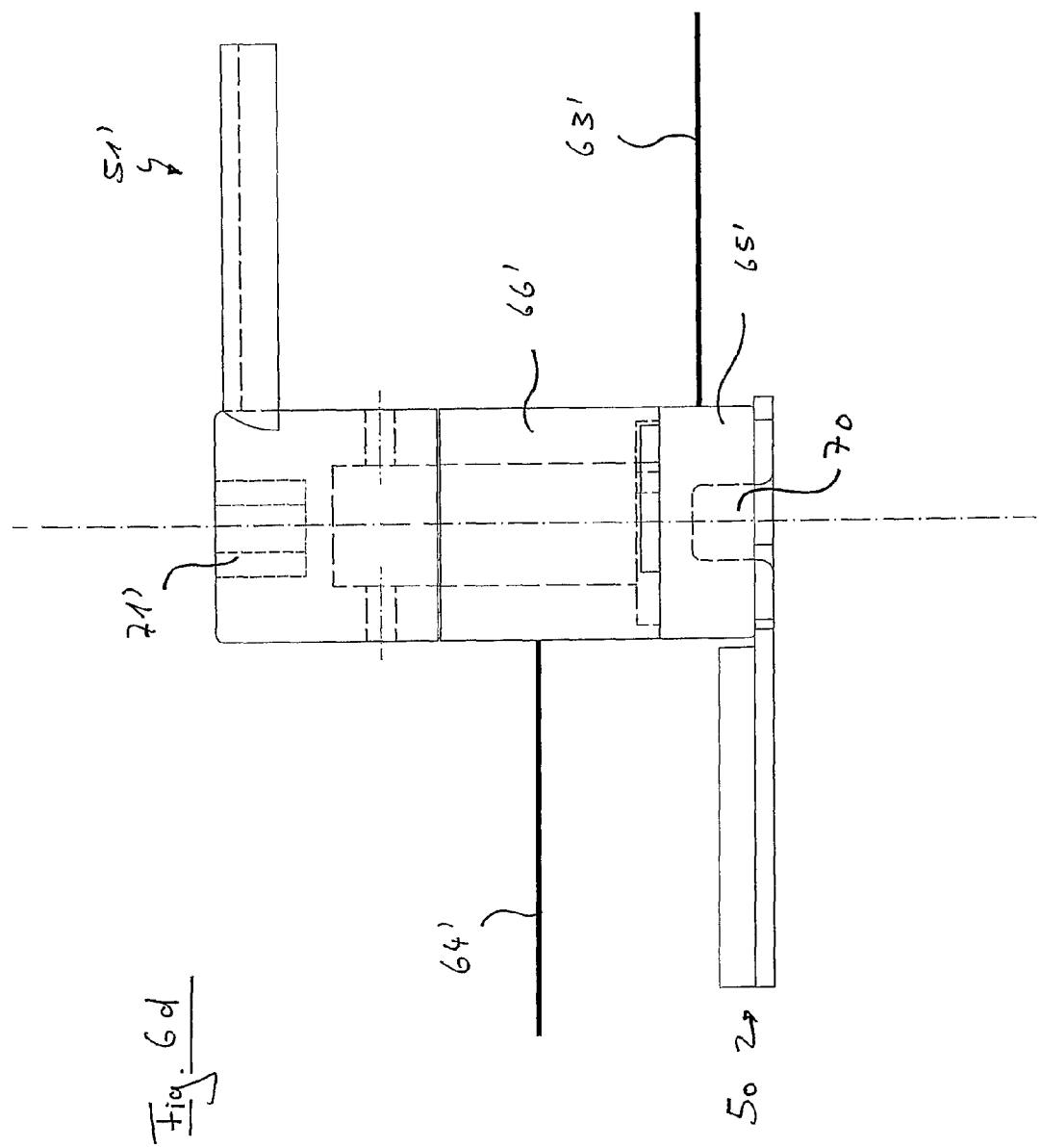

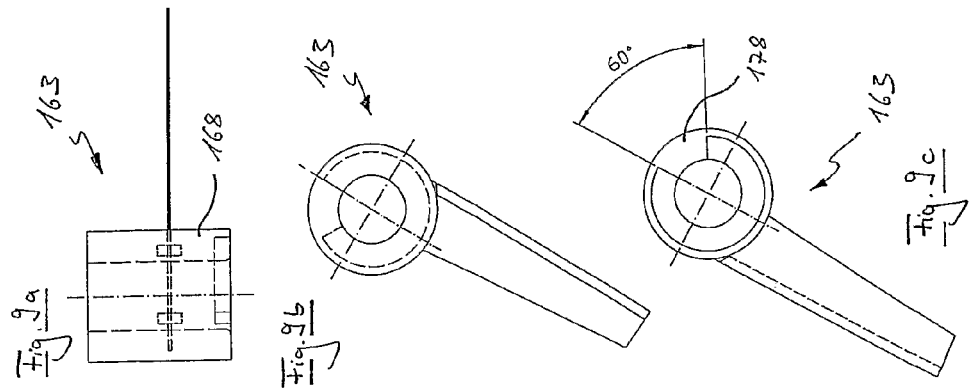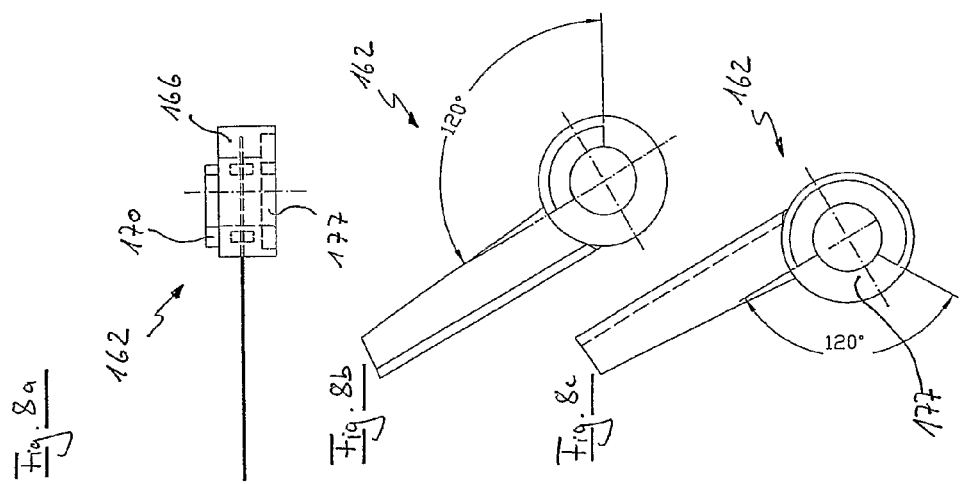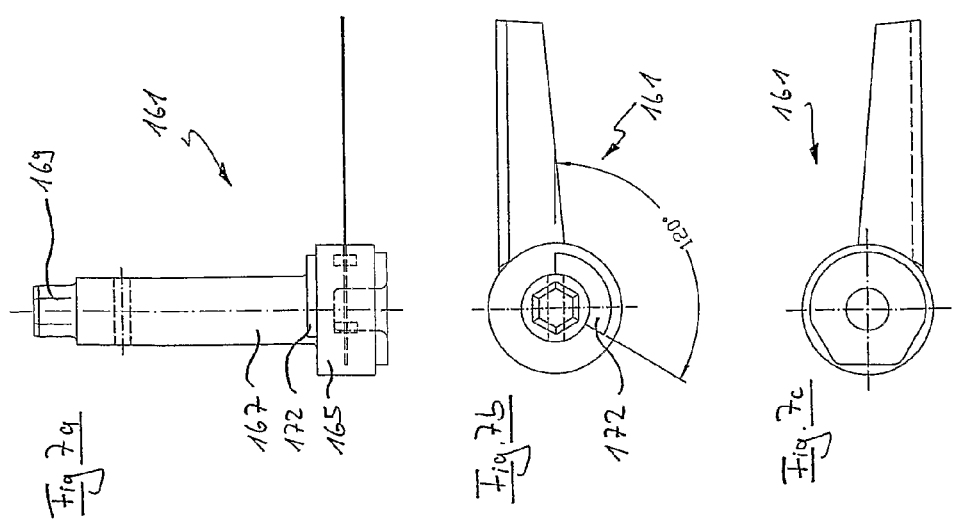

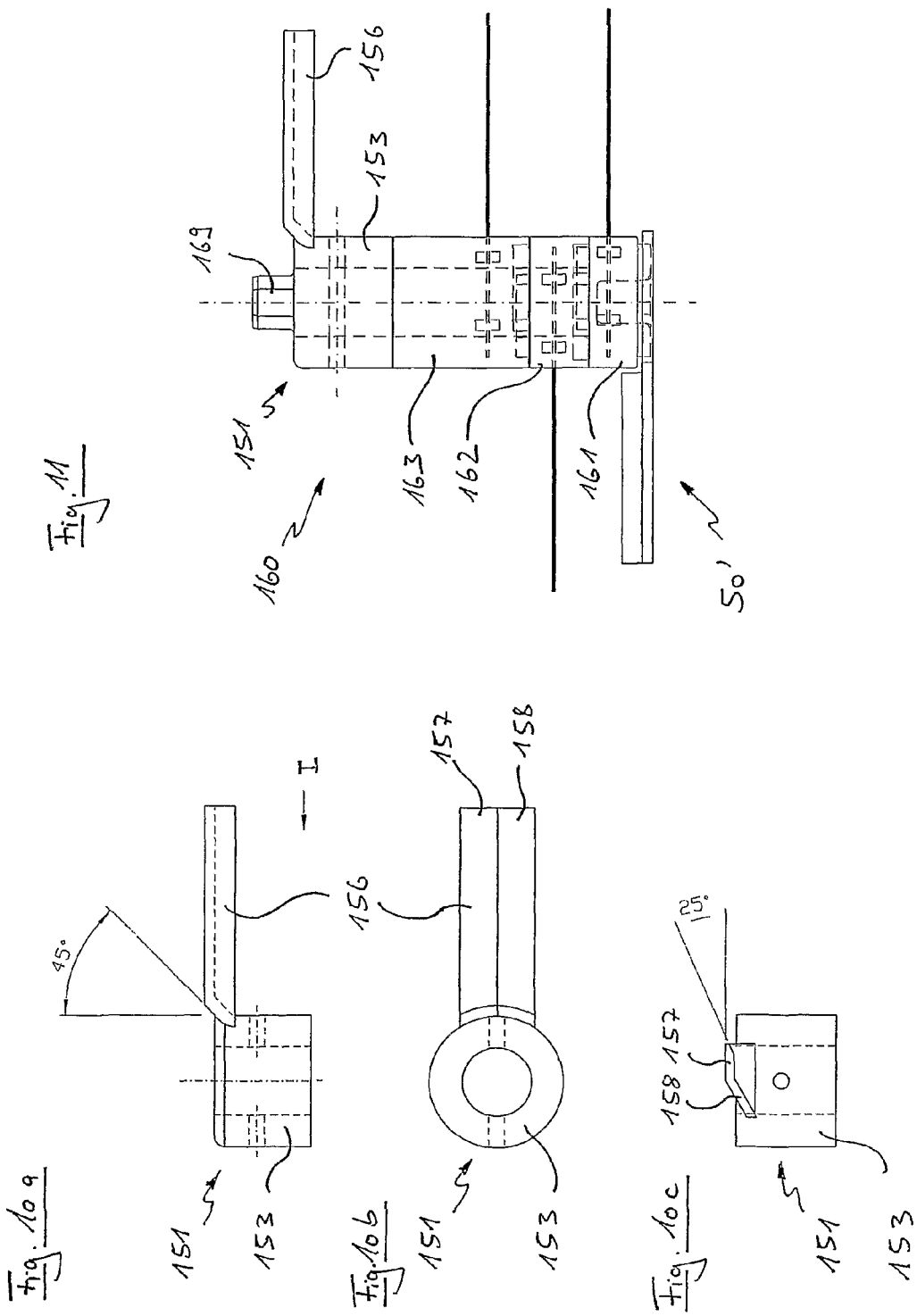

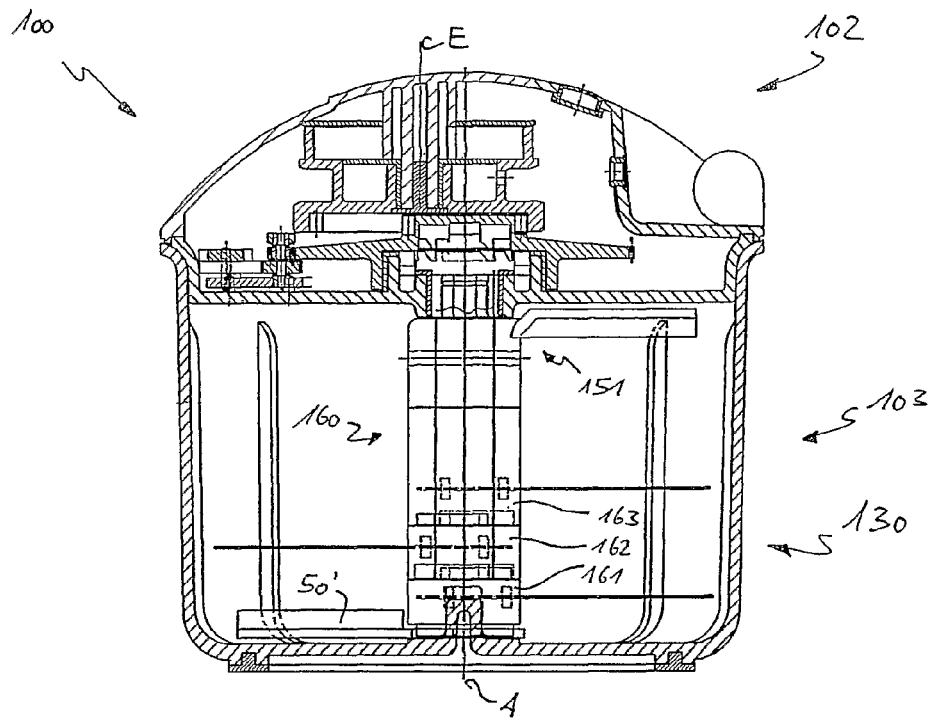
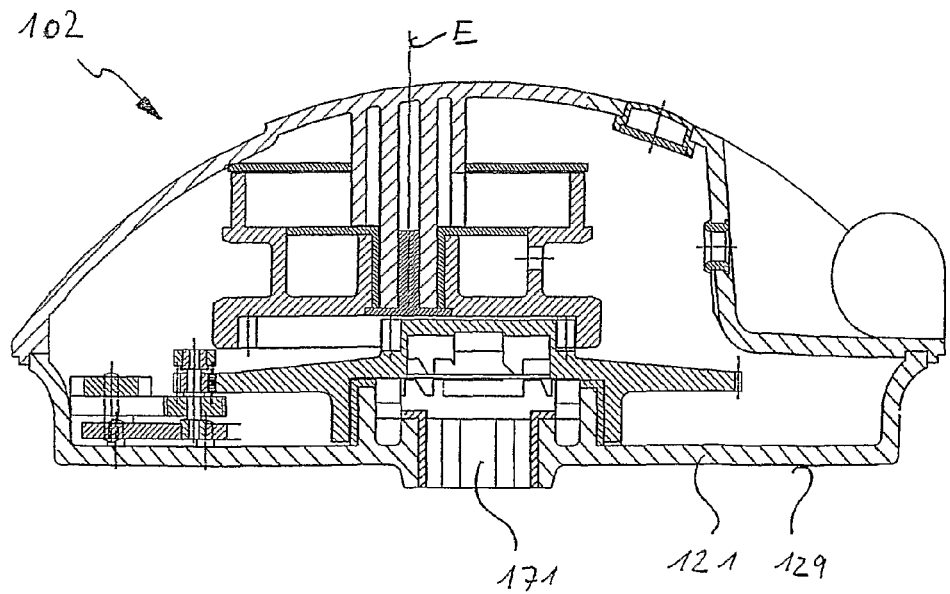

DEVICE FOR PROCESSING FOODSTUFFS

CROSS REFERENCE TO RELATED APPLICATIONS

The present application is a 35 U.S.C. §371 National Phase conversion of PCT/CH2007/000217, filed May 3, 2007, which claims benefit of Swiss Application No. 730/06, filed May 4, 2006, the disclosure of which is incorporated herein by reference. The PCT International Application was published in the German language.

FIELD OF THE INVENTION

Choppers for comminuting foodstuffs, in particular for chopping onions, are known for example from U.S. Pat. No. 6,467,711 or EP-B-0 345 223, which have a housing which can be inverted over the material to be comminuted and have a cutter, which is guided inside the housing and can be displaced against the force of a spring by means of an actuating mechanism with a pushbutton and a plunger. The cutter can be downwardly displaced against the force of the spring and, in the course of the subsequent upward movement, is rotated over a defined angle in relation to the housing by a guidance device in the housing. A stepping mechanism arranged between the actuating mechanism and the housing makes sure that a forced stepping of the cutter is assured. This forced stepping mechanism has been shown to be very advantageous, because it prevents the cutter from "chopping in place". The effectiveness of the chopper is increased by this and the evenly sized distribution of the chopped material is improved. The devices are widely distributed, however, they have some disadvantages. For example, for chopping hard vegetables it is necessary to hit the pushbutton with great force. Fibrous vegetables, such as fennel or leeks, can be chopped only poorly or not at all, and in connection with fine materials to be cut, the results are rather unsatisfactory.

Devices driven by a crank for processing vegetables have been known for years, such as the device in U.S. Pat. No. 6,035,771, for example, in which two blades, which project at right angles in two opposite directions, are arranged on a shaft which extends perpendicularly into a container for material to be cut. The blades are each provided with a cutting edge only at the front edge, so that the crank must always be turned in a clockwise direction. Because of the constant direction of rotation of the blades and as a result of the relatively low number of revolutions it is only possible to achieve moderate results in connection with hard or fibrous material to be cut, because the material to be cut is often either taken along by the blades and is not cut, or the blades are blocked. It is only possible to somewhat counteract this by a comparatively high speed of the blades which, however, in particular when chopping onions, can easily result in that a satisfactory degree of homogeneity only occurs at a high degree of comminution. This problem also occurs with electrically operated devices, in connection with which an undesired generation of heat is added to all this.

A small, manually operated device is known from WO 2004/073474, which is hand-held for operation. A shaft with two blades, which project at right angles in opposite directions, is driven by means of the repeated rotation of the drive mechanism in relation to the container with the material to be chopped. Since the device must be almost completely enclosed by the hands of the user, the structural size is extremely limited. The material to be chopped—for example an onion—must be cut into quarters for filling, since otherwise there is no room for it in the container for the material to be chopped. For achieving a satisfactory chopping result it is necessary to rotate the drive element 40 to 60 times alternatingly in opposite directions in relation to the remaining parts of the device. Since the blades are provided with cutting edges on both sides, it is possible to cut in both directions by a directed reversal of the turning direction of the shaft. Although the device has acceptable chopping results, it has the disadvantage that it is not possible to process larger amounts of material to be cut within a sensible amount of time. Since the material to be cut—for example an onion—must already be cut into quarters prior to being put into the device, the use of the device is often completely omitted and the onion is simply further chopped by means of the knife.

A further small manual device is known from EP 1 385 409, in which a shaft having four radially projecting blades, which are arranged spaced apart at approximately right angles in respect to each other, can be pushed onto a driven shaft. Movement of the shaft takes place by means of a cord pull, wherein the device is freely held in one hand and the cord pull must be pulled with the other hand. For achieving a homogeneous chopping result, the material to be chopped can be mixed by shaking between the pulls on the cord pull. Again, only a small amount of material to be chopped, which must be cut into pieces prior to chopping, can be filled in between the blades and under the shaft supporting the blades and projecting freely into the container for the material to be cut. If too much or too large-sized material to be cut is filled into the container for the material to be chopped, blockage of the device can occur when pulling on the cord pull, because all four blades cut simultaneously.

BACKGROUND OF THE INVENTION

The invention is based on the object of creating a processing unit which is, for example, designed as a cutting unit, which can be installed in a device in accordance with the species in order to avoid the above mentioned disadvantages, and which is capable of processing increased amounts of material difficult to process, such as material to be chopped, for example hard, fibrous and/or wet material to be processed, without problems. A further object is to assure the large uniformity of processing of the material to be chopped, even at a reduced degree of comminution. It is moreover intended to permit its employment in connection with further processing steps of foodstuffs, besides cutting or chopping, to be simple, safe and easy to operate and clean with little effort.

This object is attained by means of a processing unit having the characteristics of claim 1, or respectively of a device having the characteristics of claim 15.

In a preferred embodiment of the processing unit in accordance with the invention for a device for processing foodstuffs, this drive unit comprises at least two processing means arranged on a processing axis A and acting in the circumferential direction of the processing axis A, wherein at least one processing means can be pivoted in relation to at least one further processing means within a limited pivot angle around the processing axis A.

In a further embodiment of the processing unit in accordance with the invention, the processing axis (A) is defined by a support shaft.

In a further embodiment of the processing unit in accordance with the invention, the processing means have been selected from the following group or comprise combinations from it: blades for cutting and/or squeezing, fingers for kneading or peeling, beaters for creating foam.

In a further embodiment of the processing unit in accordance with the invention, it is embodied as a cutting unit and has at least one first blade, which is arranged, secure against twisting, on the support shaft. It moreover has at least one second blade, which can be pivoted in relation to the first blade, preferably around 180°, around the common processing axis A from a position of rest into a cutting position.

In a further embodiment of the processing unit in accordance with the invention, it is embodied as a cutting unit and has at least one first blade, which is arranged, secure against twisting, on a support shaft. It moreover has at least one second blade, which can be pivoted in relation to the first blade, preferably around 120°, around the common processing axis A from a position of rest into a cutting position. Furthermore, this processing unit has a least a third blade which can be pivoted in relation to the first blade, preferably around 240°, around the common processing axis A from a position of rest into a cutting position.

In a further embodiment of the processing unit in accordance with the invention, it is embodied as a cutting unit, wherein this time a transition piece is arranged at least between a first blade and a second blade in such a way, that the pivot angle of the second blade in respect to the first blade is increased to more than 360°.

In a further embodiment of the processing unit in accordance with the invention, it is embodied as a cutting unit and has at least one first blade, which is arranged, secure against twisting, on a support shaft. It moreover has at least one second blade, which can be pivoted in relation to the first blade, preferably around 480°, around the common processing axis A from a position of rest into a cutting position. Furthermore, it has a least a third blade which can be pivoted in relation to the first blade, preferably around 960°, around the common processing axis (A) from a position of rest into a cutting position.

In a further embodiment of the processing unit in accordance with the invention, all blades can be arranged resting above each other in their positions of rest, viewed in the direction of the processing axis A.

In a further embodiment of the processing unit in accordance with the invention, its blades are substantially oriented radially in respect to the processing axis A.

In a further embodiment of the processing unit in accordance with the invention, a deflector, having respectively one deflector wing acting in the circumferential direction of the processing axis (A), is arranged above and/or below the processing means. During the operation of the processing unit these deflectors turn along with the support shaft in order to convey the material to be processed, which had been flung upward or downward out of the effective range of the processing means in the course of the rotation of the processing unit around the processing axis A, back into this selfsame effective range.

In a further embodiment of the processing unit in accordance with the invention, the deflectors are arranged substantially radially in respect to the processing axis A.

In a further embodiment of the processing unit in accordance with the invention, a lower deflector can be fastened, held in place by torque and releasably, at a lower end of the processing unit, viewed in the direction of the processing axis A.

In a further embodiment of the processing unit in accordance with the invention, the processing means are arranged at an axial spacing from each other in the direction of the processing axis A.

In a further embodiment of the processing unit in accordance with the invention, the blades, viewed in the direction of the processing axis A, are arranged closer to the lower end of the processing unit than to the oppositely located upper end of the processing unit.

In a preferred embodiment of a device for processing foodstuffs, this device has a top part, a drive unit, a lower part with a processing container, as well as a processing unit, which can be driven by means of the drive unit and has the just mentioned characteristics.

In a further embodiment of the device its drive unit can be operated manually or electrically.

In a further embodiment of the device its drive unit and its processing unit are in an operative connection with each other via a releasable connection maintained by means of torque.

In a further embodiment of the device its manually operable drive unit contains a crank drive mechanism, preferably a cord pull drive mechanism.

In a further embodiment of the device a winder, which can be caused to perform a rotating movement by means of pulling a cord pull, is in an operative connection with an engagement member in such a way that a resulting rpm gear ratio amounts to more than 1, preferably 1.8 to 1.9.

In a further embodiment of the device its winder is seated, maintained in place by torque and rotatably, by means of a driving wheel on a cover shaft projecting on the inside of a cover of the top part. As a result, the rotating movement of the driving wheel can be transferred to an axial wheel, which is arranged extending coaxially to the processing axis A.

In a further embodiment of the device an interior tooth arrangement of the driving wheel engages an exterior tooth arrangement of the axial wheel.

In a further embodiment of the device, its processing container is a substantially rotation-symmetrical vessel for receiving material to be processed, and its processing unit is rotatably seated in this processing container.

In a further embodiment of the device, its processing unit, viewed in the direction of the processing axis A, is seated with an upper end of the processing unit, which is in an operative connection, maintained by means of torque, with the drive unit, as well as with a lower end, facing away from the upper end, which is rotatably seated in the bottom of the processing container.

In a further embodiment of the device a desired degree of processing of the foodstuffs is detected by an electronic unit on the basis of a defined number of processing steps, which are preferably correlated with a defined number of revolutions of the drive unit, or respectively of the processing unit, and is displayed to the user by means of a display unit.

In a further embodiment of the device, the electronic unit and the display unit are provided with electric current by a generator, which is driven by means of the drive unit and/or the processing unit.

In a further embodiment of the device, the display unit contains three LED's of different colors, preferably the colors green, yellow and red.

BRIEF DESCRIPTION OF THE DRAWINGS

The invention will be explained in what follows by means of drawing figures which merely represent exemplary embodiments. Shown are in:

FIG. 2g, a cross sectional view in accordance with FIG. 2f, in which the second blade in its position of rest has been pivoted over a first blade and the lower deflector has again been omitted, FIG. 3a, a lateral view of a first cutter with support shaft, FIG. 3b, a view from above B on the cutter in accordance with FIG. 3a, FIG. 3c, a view from below A on the cutter in accordance with FIG. 3a, FIG. 4a, a lateral view of an upper deflector unit, FIG. 4b, a lateral view of a deflector unit in accordance with FIG. 4a, turned by 90°, so that a deflector wing points toward the viewer, FIG. 4c, a view from below on the deflector unit in accordance with FIG. 4a, FIG. 5a, a lateral view of a lower deflector unit, FIG. 5b, a lateral view of a deflector unit in accordance with FIG. 5a, rotated by 90°, so that a deflector wing points toward the viewer, FIG. 5c, a view from above on the deflector unit in accordance with FIG. 5a, FIG. 6a, a longitudinal sectional view along a processing axis A through the device in accordance with a further embodiment, in which a processing unit embodied as a cutting unit is not represented in section, FIG. 6b, a section through a top part in accordance with FIG. 6a, FIG. 6c, a section through a lower part of the device in accordance with FIG. 6a with the cutting unit inserted, in which the cutting unit is not represented in section, FIG. 6d, a lateral view of the cutting unit in accordance with FIG. 6a, FIG. 6e, a view from above on the top part in accordance with FIG. 6a, FIG. 6f, a partial section along D through a container wall with a rib of a device in accordance with FIG. 6a, FIG. 7a, a lateral view of a first cutter with support shaft in accordance with a further embodiment, FIG. 7b, a view from above on the first cutter in accordance with FIG. 7a, FIG. 7c, a view from below on the first cutter in accordance with FIG. 7a, FIG. 8a, a lateral view of a second cutter in accordance with a further embodiment, FIG. 8b, a view from above on the second cutter in accordance with FIG. 8a, FIG. 8c, a view from below on the second cutter in accordance with FIG. 8a, FIG. 9a, a lateral view of a third cutter, FIG. 9b, a view from above on the third cutter in accordance with FIG. 9a, FIG. 9c, a view from below on the first cutter in accordance with FIG. 9a, FIG. 10a, a lateral view of an upper deflector in accordance with a further embodiment, FIG. 10b, a view from above on the deflector in accordance with FIG. 10a, FIG. 10c, a lateral view from the direction I of a deflector unit in accordance with FIG. 10a, rotated by 90°, so that a deflector wing points toward the viewer, FIG. 11, a lateral view of a cutting unit in accordance with a further embodiment in the assembled state and with blades and deflectors in accordance with FIGS. 7 to 10 in the processing position, FIG. 12a, a longitudinal section along the processing axis A through the device in accordance with a further embodiment, in which a cutting unit is not represented in section, FIG. 12b, a section through a top part in accordance with FIG. 10a, FIG. 13a, a processing unit embodied as a cutting unit in accordance with a further embodiment, in which the lower deflector unit has been omitted, FIG. 13b, a view from above on the cutting unit in accordance with FIG. 13a, FIG. 14a, a lateral view of a first cutter with support shaft in accordance with FIG. 13a, FIG. 14b, a view from above on a first cutter in accordance with FIG. 13a, FIG. 14c, a view from below on a first cutter in accordance with FIG. 13a, FIG. 15a, a lateral view of a second cutter in accordance with FIG. 13a, FIG. 15b, a view from above on a second cutter in accordance with FIG. 13a, FIG. 15c, a view from below on a second cutter in accordance with FIG. 13a, FIG. 16a, a lateral view of a third cutter in accordance with FIG. 13a, FIG. 16b, a view from above on a third cutter in accordance with FIG. 13a, FIG. 16c, a view from below on a third cutter in accordance with FIG. 13a, FIG. 17a, a lateral view of a transition piece in accordance with FIG. 13a, FIG. 17b, a view from above on a transition piece in accordance with FIG. 13a, FIG. 17c, a view from below on a transition piece in accordance with FIG. 13a, FIG. 18a, a lateral view of an upper deflector unit in accordance with FIG. 13a, FIG. 18b, a view from above on an upper deflector unit in accordance with FIG. 13a, FIG. 18c, a partial plan view through an upper deflector unit in accordance with FIG. 13a, and FIG. 18d, a front view of an upper deflector unit in accordance with FIG. 13a.

DETAILED DESCRIPTION OF THE PREFERRED EMBODIMENTS

Figure 1A:
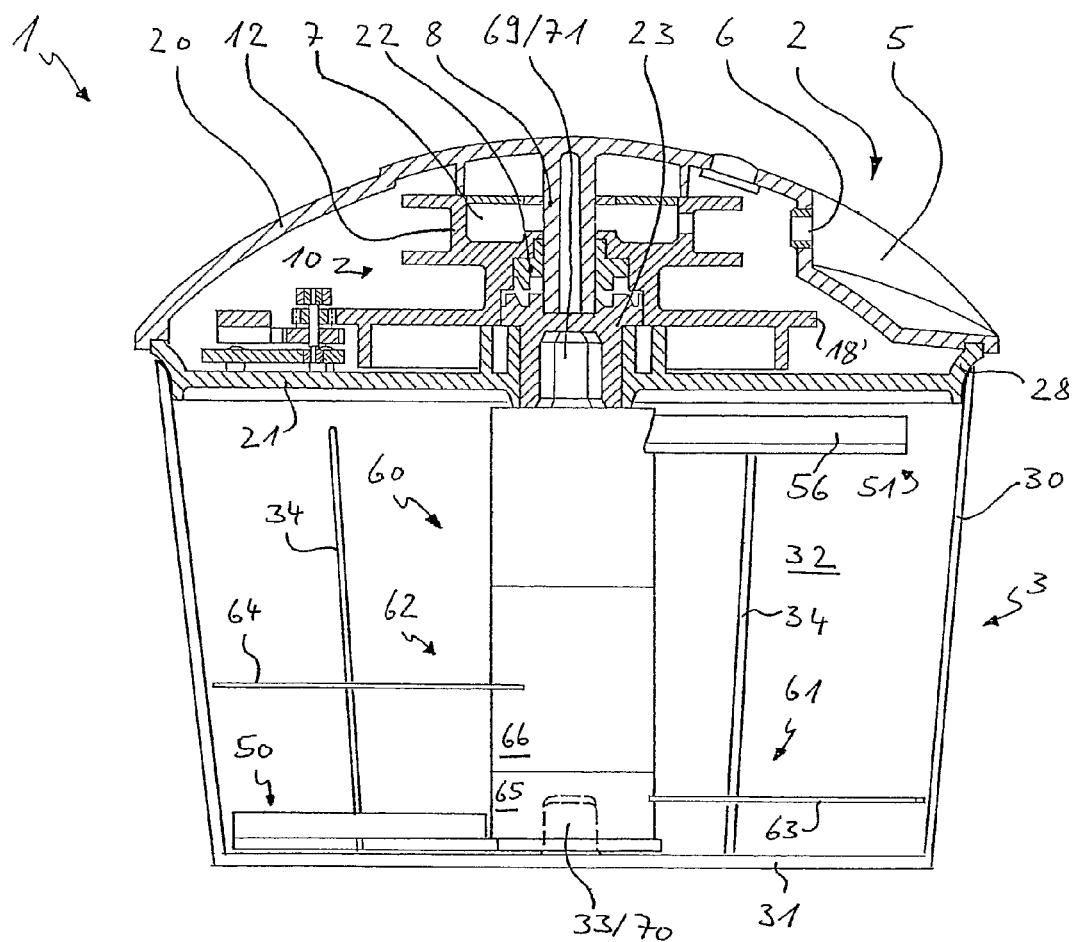
FIG. 1a, a longitudinal sectional view along a processing axis A through the device in accordance with a first embodiment, in which a embodied as a cutting unit is not represented in section, FIG. 1b, a sectional view through a top part in accordance with FIG. 1a, in which portions of a drive unit are not shown in section, FIG. 1c, a view from above on the top part in accordance with FIG. 1a, in which a cover has been omitted, FIG. 1d, a lateral view of a generator unit for installation in a top part in accordance with FIG. 1a, FIG. 2a, an exploded view of a processing unit designed as a cutting unit in accordance with an embodiment of the invention, FIG. 2b, a lateral view of the cutting unit in accordance with FIG. 2a in the installed state, with the blades in the processing position, FIG. 2c, a view from above B on the cutting unit in accordance with FIG. 2b, FIG. 2d, a view from below A on the cutting unit in accordance with FIG. 2b, FIG. 2e, a view from obliquely below on the cutting unit in accordance with FIG. 2b, in which a position of rest of a second blade is shown in dashed lines, FIG. 2f, a cross-sectional view along X-X through the cutting unit in accordance with FIG. 2b, in which a processing position of a second blade is shown by dashed lines, and a pivot direction is indicated by an arrow, and a lower deflector has been omitted.
Figure 1B:
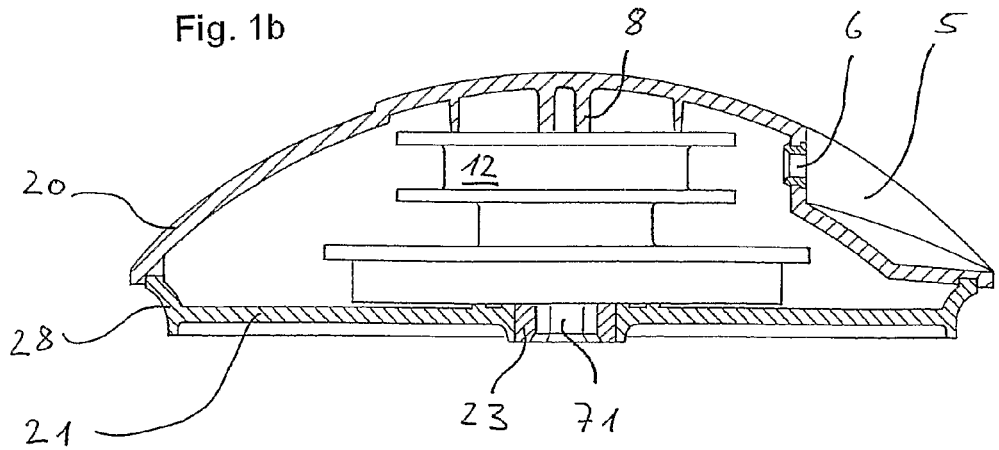
Figure 1C:
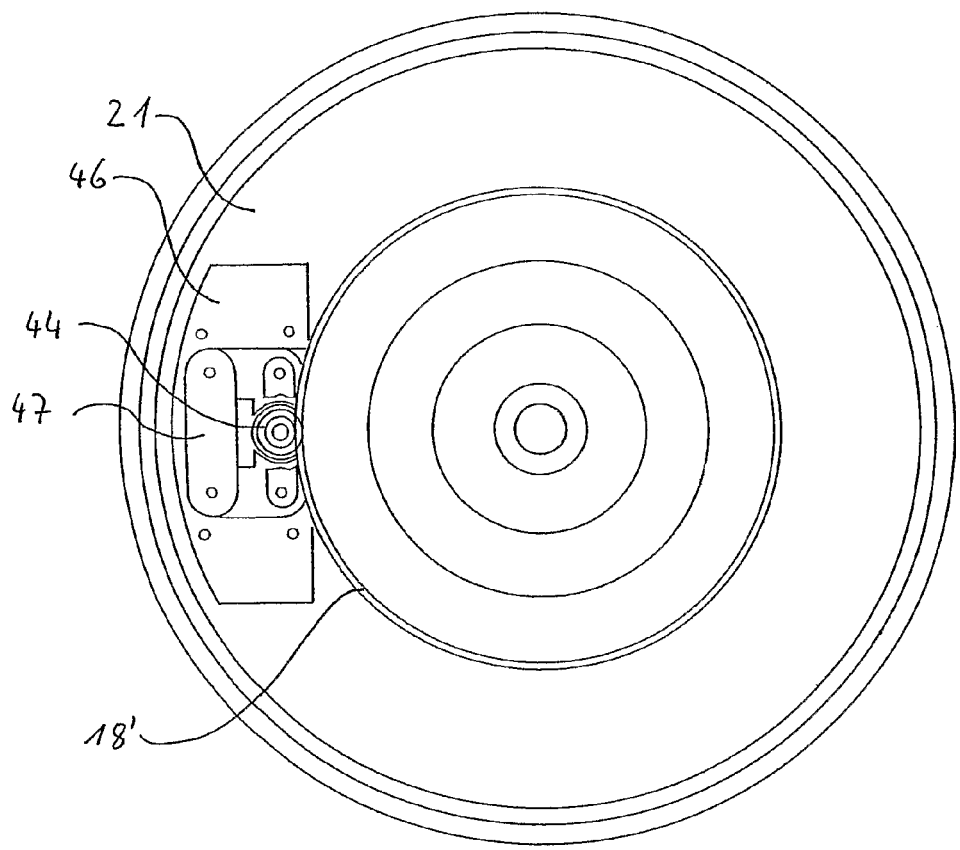
Figure 1D:
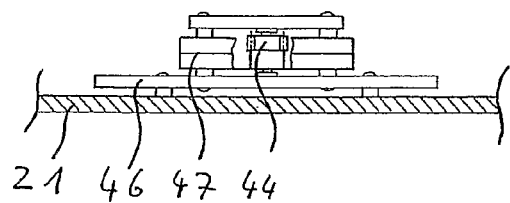

A first embodiment of the device 1 for processing foodstuffs in accordance with the invention is represented in axial longitudinal section in FIG. 1a, in which a processing unit 60 is embodied as a cutting unit 60 and is not shown in section. The device 1 is substantially rotation-symmetrical and has a top part 2, which is comprised of a circular, substantially flat base 21 with a curved cover 20 placed on it. Essential parts of a drive unit 10 are housed between the cover 20 and the base 21. The top part 2 can be placed in a positive and/or non-positive manner on a lower part 3 which, in the present case, comprises a circular, bowl-shaped processing container 30 designed as a container 30 for material to be cut. The container 30 for material to be cut is preferably made of a transparent or semi-transparent plastic material approved for foodstuffs and includes a bottom 31 with a centered, upward oriented bearing pin 33 and a lateral wall 32 with a plurality of vertical swirling ribs 34, evenly distributed over the circumference. On its underside the cutting unit 60 is provided with a central bearing opening 70, by means of which it can be plugged onto the bearing pin 33 in the container for material to be cut. The cutting unit 60 in accordance with the represented embodiment is substantially constituted by a multi-part shaft, from which two blades 63, 64 and two deflectors 50, 51 protrude, as the operative means—also called processing means in what follows—substantially radially, viewed in the circumferential direction, in relation to a processing axis A. Here, a section of the processing means 60, which is substantially circular-cylindrically shaped, is understood to be the shaft by which the processing axis A is defined. A drive cam 69 at the top, in the exemplary embodiment a cam with a hexagonal exterior, of the cutting unit 60 engages a corresponding reception opening 71 of an engagement member 23 of the drive unit, so that the torque can be transferred from the engagement member 23 of the drive unit 10 to the cutting unit. In this way the ends of the shaft with the operative means are dependably seated at the top and the bottom, and during the operation can absorb without problems the forces introduced into the operative means, in the present example the cutters 61, 62 and the strippers 50, 51, even at high rpm, without being deflected out of their axial position. In the exemplary embodiment represented, the rotating movement is generated by a cord pull mechanism. Neither the cord nor the handle have been drawn in FIG. 1. With the cord wound up, the handle comes to rest in the recess 5 of the cover 20, and the cord fastened to it is conducted under low friction to a winder or cord roller 12 attached to the interior of the top part 2. A spring housing 7 is arranged concentrically in relation to the winder 12 on a cover shaft 8, which has been centrally formed on the cover 20 and extends downward in the direction toward the processing axis A. A restoring spring, also not drawn in, is located in the spring housing, whose function is known in connection with the cord pull mechanism and need not be explained further. The winder is caused to rotate by pulling on the cord pull and in the course of this rotation the spring is prestressed in the operating direction until the cord is completely unwound, preferably after 3 to 6 rotations of the winder. In the course of the operational rotation, the rotating movement of the winder 12 is transmitted to an upper coupling element 22 assigned to the drive unit 10, which is arranged in a manner in which it is maintained in place by torque and axially displaceable on the cover shaft 8 and is in operative connection with the winder 12. In FIG. 1a the upper coupling element 22 is located in an upper release position, in which it does not engage with its counter-tooth arrangement on its underside the corresponding tooth arrangement of a lower coupling element, also called engagement member 23, facing the lower part 3. The upper coupling element 22 is prestressed against the engagement member 23 by means of a spring, not represented in the drawing figure, so that during the operation the torque from the upper coupling element can be transmitted to the engagement member in the course of the rotation in the processing direction because of the positive connection between the teeth of both coupling elements through engagement with each other. Since in the exemplary embodiment represented only a rotation in the processing direction is desired for the downstream-located processing means, the coupling is provided with only a one-directional free-running device in the restoring direction, i.e. opposite the processing direction. As is known from other ratchet mechanisms, the teeth are slanted in opposite directions on one side, so that the upper coupling element 22 can be pushed into the upper release position during the recovery rotation of the cord pull and the cutting unit can stand still during the rewinding of the pull cord. In the course of the next pull on the handle the top coupling part 22 is turned again into the processing direction and it again engages the engagement member 23, so that the latter can continue the rotating movement in the processing direction. The rotating movement is transmitted 1:1 from the drive unit to the cutting unit 60 by means of the torque-derived connection which, in the present exemplary embodiment, is realized by means of the interior and exterior hexagonal structure, between the reception opening 71 of the engagement member 23 and the drive cam 69 at the top of the support shaft 67.

The base 21 of the top part has a central circular opening, in which the substantially cylindrical engagement member is rotatably seated with suitable fit. Since the reception opening 71 is embodied as a blind hole and the base 21 does not have any other further openings, the areas of the top part which come into contact with the foodstuffs to be processed can be very easily cleaned. In the peripheral area the base is solidly connected, sealed along the circumference, with the cover, so that foodstuff remnants or water are prevented from penetrating into the interior of the top part 2.

Figure 6C:
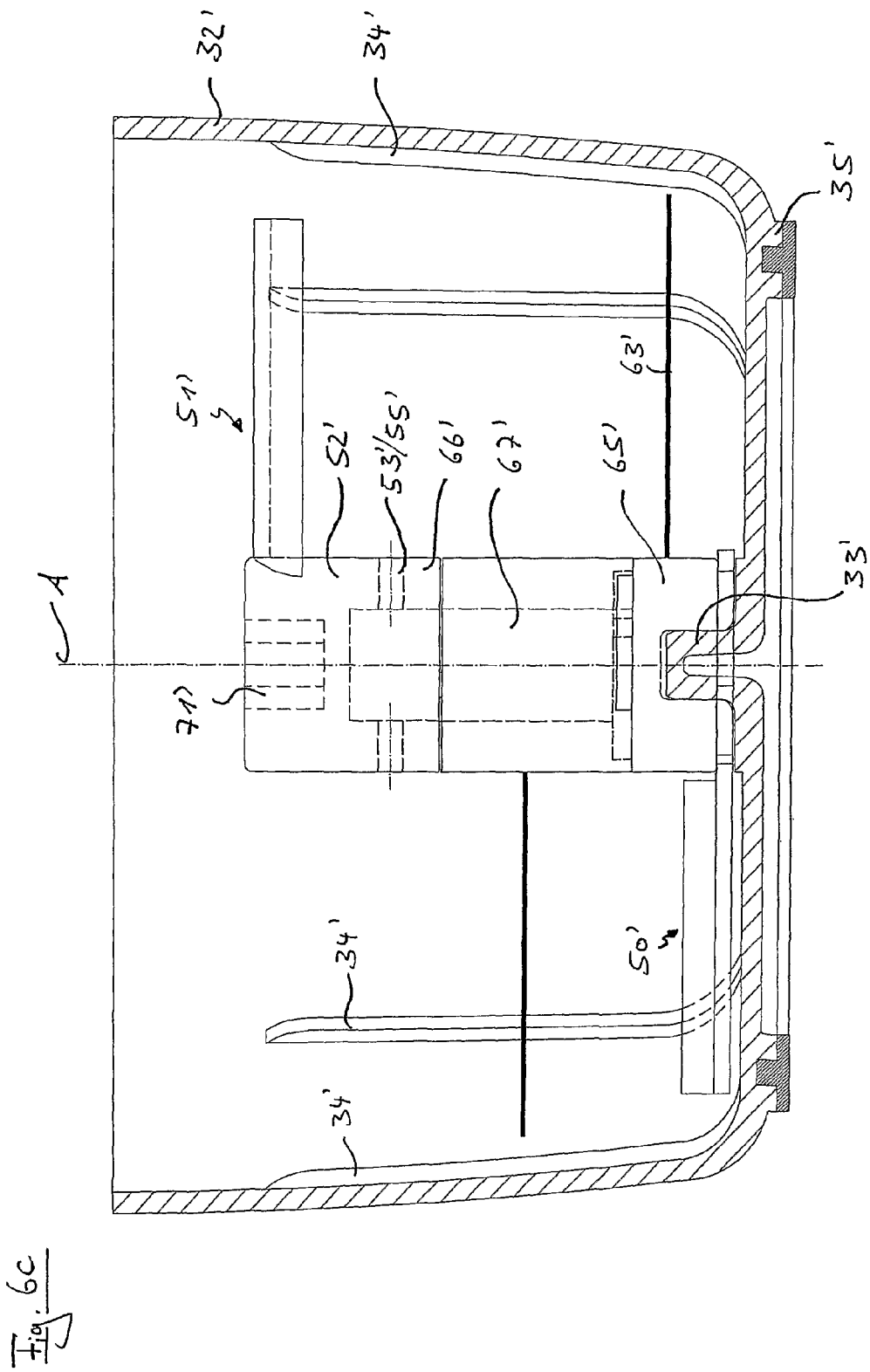
Figure 13A:
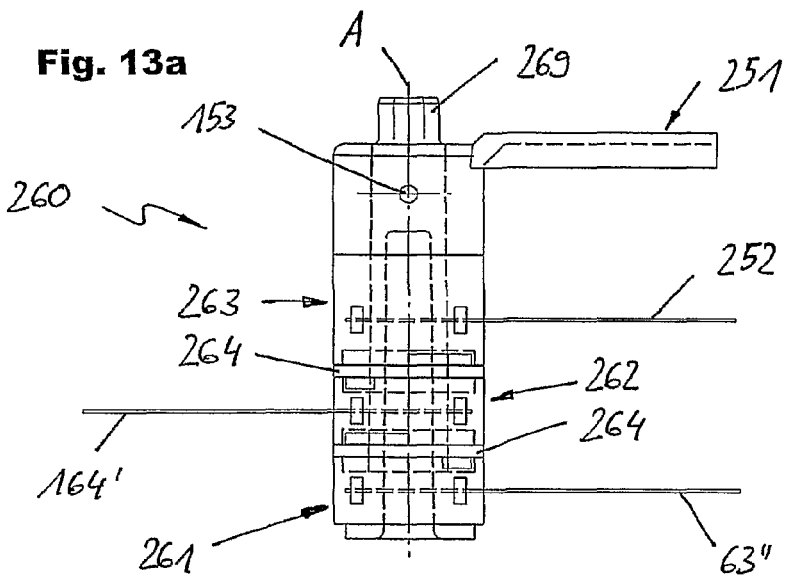
Figure 13B:
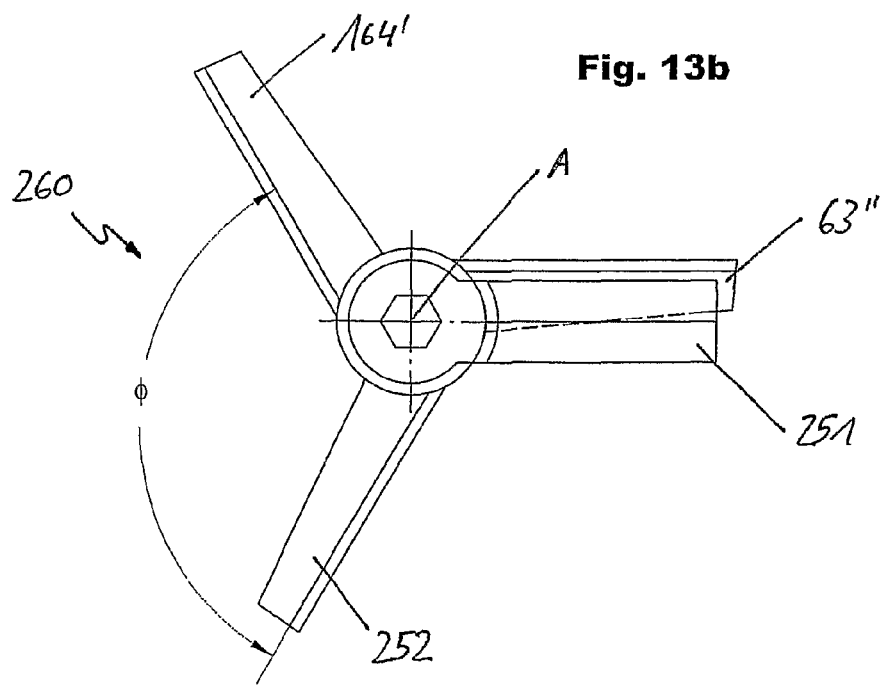

In the exemplary embodiment in FIG. 1a, the base 21 is provided with a peripheral circumferential lateral wall 28, which has an exterior contour permitting the positive and/or non-positive placement of the top part 2 on the container 30 for material to be cut. The clearance between the underside of the engagement member 23 and the bottom 31 of the container 30 for material to be cut corresponds substantially to the height of the cutting unit 60 without its drive cam 69 at its top. Top and bottom seating of the cutting unit are respectively designed in a positive and/or protected manner in such a way, that no material to be cut can enter and become stuck. As indicated in FIG. 6c, a slip-protection device made of soft rubber or a silicone material has been applied to the underside of the container bottom 31'. The vertical swirling ribs 34', evenly distributed over the circumference of the inner container wall, extend from the bottom of the container as far as almost to the rotation height of the upper deflector wing 56'. The swirling ribs 34', represented in FIG. 6f in a partial sectional view through the container wall 32', radially project a few mm inward into the container and are matched to the length of the blades and of the deflector wings in such a way that, although the latter are moved closely past the swirling ribs 34', they do no touch them in any way. The function of the swirling ribs 34' in connection with cutting of peeling of vegetables or fruit is known and need not be further explained here.

Figure 2B:
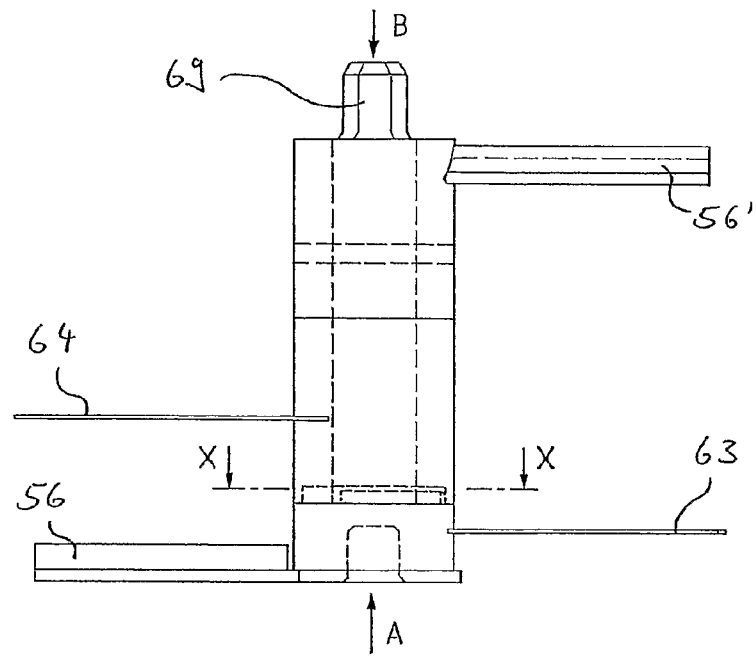
Figure 2C:
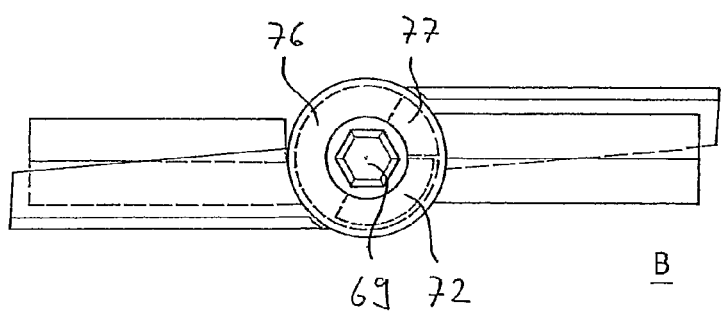
Figure 2D:
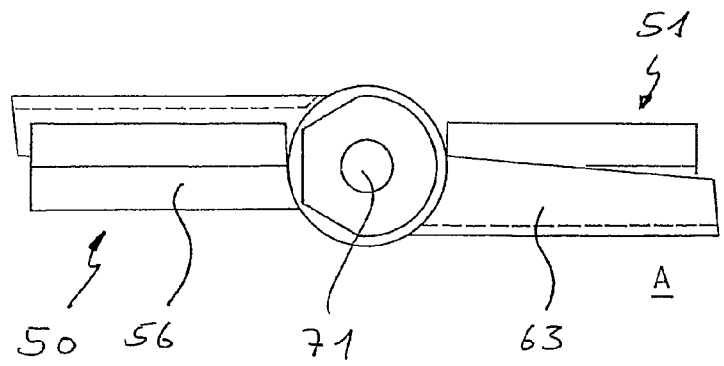
Figure 3A:
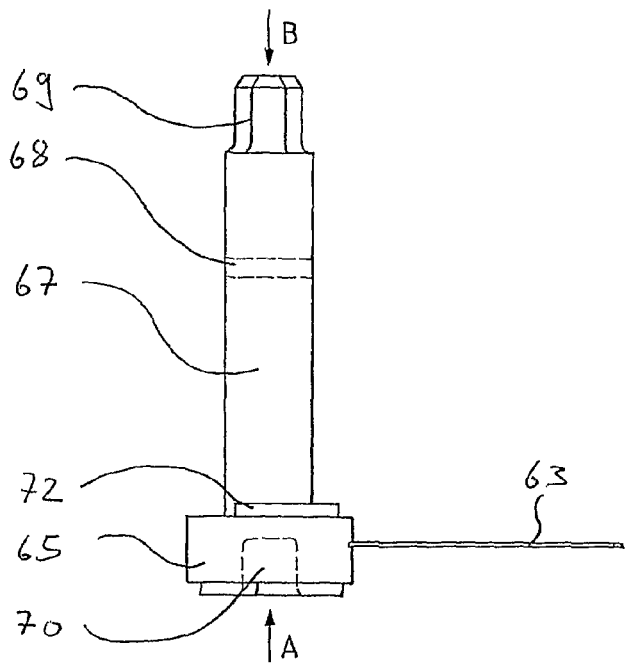
Figure 3B:
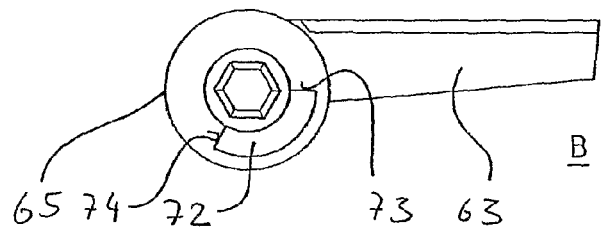
Figure 3C:
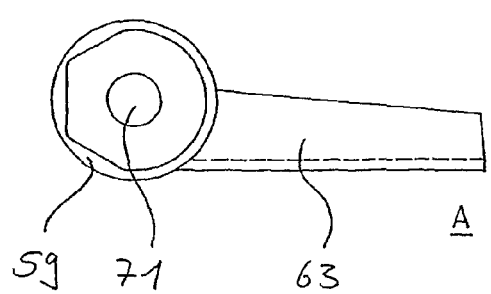

The essential aspects of the novel processing units 60 will now be explained in greater detail in what follows by the use of the cutting unit in FIG. 2. It can be seen from the exploded view in FIG. 2a that the cutting unit 60 comprises a first cutter 61 and a second cutter 62, which can be pivoted in relation to each other by a predetermined pivot angle around the common axis A. As a first, lower cutter 61 and upper, second cutter 62, the two cutters 61, 62 are preferably axially spaced apart from each other and fixedly arranged in the axial direction in respect to each other. A base blade holder 65, substantially cylindrical, of the lower cutter 61 supports a radially projecting blade 63, which is provided with a cutting edge on a front edge. The front edge is that edge of the blade 63 which, during cutting, i.e. in the course of the rotation in the processing direction P, is located at the front and therefore comes into contact with the material to be cut. A central support shaft 67, which defines the processing axis A, whose diameter is less than the diameter of the blade holder 65, extends coaxially in relation to the blade holder 65, is fixedly connected with it and has the drive cam 69 at the top. With its height, the first cutter 61 determines not only the height of the entire component of the cutting unit 60, but also constitutes the basic structure. The blade holder of the second cutter 62 is a hollow cylinder, which can be plugged onto the support shaft 67 and preferably has the same exterior diameter as the first blade holder 65. The interior diameter of the second blade holder is correspondingly matched to the diameter of the support shaft 67, so that the second cutter 62 can be easily rotated. As a further element, the holder 52 of an upper deflector 51 is pushed on the support shaft 67. For fastening the upper deflector to the support shaft 67 in a manner secure against twisting and axially non-displaceably, a securing pin or cotter pin 53 is pushed through corresponding cotter pin holes 55 and 68 in the holder 52 and the support shaft 67 in this embodiment. The securing pin 53 is completely inserted into the cotter pin holes and its length has been matched to the exterior diameter of the deflector holder 52 in such a way that on both sides the securing pin ends constitute an almost closed surface with the shell face of the holder 52. This has proven itself for preventing foodstuff from becoming stuck in small, difficult to access and therefore difficult to clean recesses. For this reason it has also been proven to be advantageous to design each of the blade holders 65, 66 and the holder 52 of the upper deflector 51 cylindrically and to select their diameters in such a way that they define an aligned common shell face. In the represented case, the stop area between the holder of the upper deflector 51, which is fixedly arranged on the support shaft, and the limitedly rotatable holder 66 of the second cutter, has been designed as a flat annular face 72. Means responsible for the limited relative rotatability of the two blade holders, and therefore also of the two blades 63, 64 in respect to each other, have been placed into the stop area between the two blade holders 56 and 66. In the concrete exemplary embodiment of FIG. 2, these are a radial rib 72 seated on the top of the blade holder 65 and defining a front and a rear stop face 73, 74. The stop faces 73, 74 are substantially aligned radially in respect to the processing axis A and include an angle of approximately 120° between them. The radial lip does not extend to the edge of the top of the first blade holder 65, so that an downward drawn apron 75 of the second blade holder can rest on the correspondingly shaped top of the first blade holder 65 and covers the radial rib completely. The apron 75 defines an annular gap 76 in the shape of a segment of a circle, in which a stop 77 is fixedly arranged on the second blade holder 66. As a counterpiece to the radial rib 72, the stop 77 is also equipped with a front and a rear radial stop face which, however, on the stop side only include an angle of 60° between them. It becomes clear from FIGS. 2f and 2g, in which the cutting unit 60 is shown in section in the area of the annular gap 76, how the dimensioning of the rib 72 and the stop 77 affects the placement of the positions of rest and operation, or respectively the operating positions of the blade 64 in relation to the first blade 63. In FIG. 2f the blade 64 (represented in dash-dotted lines) is in a operating position which is pivoted by approximately 180° in relation to the first blade, and the arrow P indicates the direction of rotation of the blade during cutting. In the operating position, the rear stop face 79 of the stop 77 rests against the front stop face 73 of the radial rib 72 and prevents the pivoting of the second blade 64 opposite the working direction P. However, the second blade 64 can be pivoted in the working direction around the support shaft into a position of rest of 0°, in which the second blade 64 comes to lie above the first blade 63. As represented in FIG. 2g, the front stop face 78 of the stop 77 rests against the rear stop face 74 of the radial rib 72 and prevents the further pivoting of the first blade in the working direction past the position of rest.

While, in the embodiment represented, the relative pivotability of the cutters in respect to the blades in relation to each other is predetermined and limited by the stops arranged on the blade holders, in further embodiment versions these means can also be arranged on a blade holder and a common shaft. Thus, the pivot movement can also be limited by an inward projecting radial pin of the blade holder, for example, which engages a radial groove in the support shaft, which extends over 189°. For example, in embodiments with two or more movable blades, the radial grooves correspondingly extend over 120° and 240° (in case of two movable blades and operating positions in the 120° and 240° positions relative to the stationary blade) or, for example, over 90°, 180°, 240° (in case of three movable blades and operating positions in the 90°, 180°, 240° positions relative to the stationary blade). An advantage of the embodiment of the processing unit represented in FIG. 2 lies in that the design of the stops allows the simple plug-in of the cutting unit in the axial direction.

In preferred types of embodiment, the blades, which are preferably made of stainless steel, for example hardened AISI 420 of a service hardness of 48-50 HRC, and are ground to form a cutting edge on one side, are extrusion-coated at the base in the course of the blade holders being produced by means of extrusion technology. Preferably, all further components of the device, with the exclusion of the cutting degree indicator and the cord, are made from plastics, such as SAN (styrene acrylonitrile), POM (polyoxy-methyline) and ABS (acrylonitrile butadiene styrene), by an extrusion process, wherein those parts which come into contact with the foodstuffs to be processed, are of course approved for use with foodstuffs.

Since the blades are equipped with cutting edges only at their front edges, for filling the container for the material to be cut the second and every other blade can be manually pivoted by the user into the position of rest without problems and without any danger of injury. In this position of rest, such as represented in FIG. 2e by means of the dash-dotted second blade, the upper deflector 51 and both blades are placed on top of each other. If the blades and the upper deflection wing are arranged in the same radial position on top of each other, the entire remaining interior space of the container 30 for the material to be cut is available for simple filling.

While only forms of embodiment with cutters, each having a blade which radially projects approximately at right angles in regard to the processing axis A, are represented in the drawing figures, the idea of the invention can also be employed in actual use with cutters having more than one blade. In such an embodiment with a stationary and a pivotably moved cutter, two blades are arranged on each blade holder and are located opposite each other, so that in the position of rest respectively one blade of each cutter is in a 0° and one in a 180° position, and the blades of the movable cutter can be pivoted into operating positions in a 90° and 240° position. In connection with further possible forms of embodiment, a lower stationary blade holder, for example, is provided with more than one blade, which is arranged with only a little spacing from the container bottom, while second and or further movable blade holders, each with only one blade, are arranged axially spaced apart above the stationary blades. If the movable blades have been pivoted into a mutual radial position of rest, with such a construction there is still a lot of volume of the container for material to be cut available for filling. Although only blades have been described in the above description as the representation of different processing means, the corresponding technical teaching can also be applied to processing units with further processing means, such as blunt pureeing bars, peeling fingers or stirring rods.

In preferred manually operated types of embodiment of the devices in accordance with the instant invention the diameter of the container for the material to be cut lies between 120 and 140 mm at a height of 70 to 90 mm. With the known devices of the same species, the stationary cutter blades hamper the introduction of material to be cut and force the user to first cut the material to be processed with a knife. Since the processing means of the devices in accordance with the instant invention can be arranged in a space-saving manner in a common position of rest and the lower deflector 50, arranged closely above the bottom, hardly takes up space, the usable free interior space of the container for the material to be cut is only restricted by the central shaft. In connection with the small, manually operated devices it is therefore already possible to insert whole onions, kohlrabi or fennel tubers. The fact that this material to be cut can actually be processed represents a further substantial advantage of the instant invention. The pivotably-movable seating of at least one cutter blade results in the amount of force required at the start of each cutting movement being considerably reduced. When the cutting unit is first operated after the container 30 for material to be cut has been filled, the lowermost blade 63, which is stationarily arranged on the blade holder 65 of the first cutter 61, cuts as soon as it encounters the material to be cut. The second blade 64, axially offset in the direction of the processing axis A and pivotably seated, also encounters the material to be cut, but because of the inertia of the material to be cut in relation to the support shaft 67, it is pivoted out of its position of rest into the operating position. In this phase the second blade 64 does not change its position in regard to the container for the material to be cut and only starts to rotate once the operating position has been reached, i.e. as soon as the first stationary blade 63 has performed half a rotation in the container 30 for the material to be cut. As soon as the operating position has been reached, the stops 72, 77 prevent the further pivoting of the movable cutter 62, and the blade 64 is suddenly put into motion in the direction P of rotation and cuts the material to be cut resting against it, again aided by its inertia. In the starting phase the initial force requirement by the user of this device 1 is considerably reduced by means of the pivotable seating of the second blade on the support shaft, since not all blades need to be cutting at the same time.

Only exemplary embodiments having a stationary and a pivotable processing means (a blade in the example) are described in the above mentioned examples and represented in the drawings. The basic principle of the novel mechanical cutting device explained in this way can now be easily transferred by one skilled in the art to a multitude of further devices without deviating from the basic principle of the invention. Preferably, it is possible to produce devices with one stationary blade and two blades which are arranged pivotably movable on a support shaft, in which the blades are preferably spaced apart from each other in the axial direction and are located in the operating position arranged at angular positions of, for example, 0°, 120° and 240° around the support shaft. In accordance with the instant invention it is analogously possible to produce devices with four cutters in the 0°, 90°, 180° and 270° positions, for example, in which case it is possible to operate with one stationary and three pivotably movable, or two stationary and two pivotably movable blades.

A device 100 with three cutters 161, 162, 163 and an upper deflector 151 in accordance with a further preferred embodiment is represented in FIG. 12 in longitudinal section, in which the processing unit 160, designed as a cutting unit 160, is itself not represented in section, but partially transparent. As previously described, the cutters 161, 162, 163 are arranged around the processing axis A in the operating position in 0°, 120° and 240° positions, in which the blade of the lowermost cutter is arranged in the same angular position as the upper deflection wing 152. For making the vertical spacing of the blades in relation to each other and to the deflectors 50', 151 clear, the blades have been represented in FIGS. 11 and 12 in respectively facing 0° and 180° positions.

As can be clearly seen in the overview of FIG. 10a, the upper deflection wing 152 is arranged, bent at right angles, on the holder 153, so that it is guided along closely underneath and substantially parallel in respect to an underside 129 of the bottom 121 of the top part 102.

The structure of the cutting unit 160 as represented in FIG. 11, corresponds in principle to the already previously described cutting unit 60 which, however, is only comprised of one cutter 162 arranged in a pivotably movable manner on the support shaft 167. In the preferred exemplary embodiment in FIGS. 7 to 11, two movable cutters 162, 163 (FIGS. 8 and 9) are provided on a support shaft 167 of a first stationary cutter 161 (FIG. 7). The design of the first stationary cutter substantially corresponds to the design of the previously described and represented cutter 61. This agreement is advantageous, since the first stationary cutter 61 can be employed in this manner for both embodiments of the device 1, 100 in accordance with the invention. The second movable cutter 162 substantially corresponds to the first movable cutter 62 of the cutting unit 60, and the lower deflector 50 can also be employed in both forms of embodiment of the cutting unit 60, 160. Since the structural height of the cutting unit 150 up to the upper drive cam 169 does not substantially differ from that of the cutting unit 60, the structural height of the holder 153 of the upper deflector 151 (FIG. 10) in comparison to that of the holder 52 of the deflector 51 is reduced by the height of the first movable cutter 162 (FIG. 8). Again, the means 172, 177, which limit the pivoting mobility of the first and second movable cutters 162, 163 relative to each other and relative to the first stationary cutter 163, are clearly visible in the views in FIGS. 7, 8 and 9. In order to make clear their effects in the embodiment with three cutters, the three cutters 161, 162, 163 are represented side-by-side in their respective relative angular position of an operating position in the views from above and from below in FIGS. 7b to 9b and 7c to 9c. Again the radial rib 172 extends at the top of the cutter holder 165 over an angle α of 120° and works together with a stop 177, which extends at an angle β of 120° on the underside of the cutter holder 166 of the first movable cutter 162, so that the blade of the latter is pivotable opposite the direction P of rotation of the cutting unit 160 by 120° around the processing axis A, then contacts it and is maintained in this 120° operating position for cutting in the course of the continued rotation. A radial rib 170, which extends on the top of the cutter holder 166 of the first movable cutter 162 over an angle β of 120°, works together analogously with a stop 178, which extends at an angle x of 60° on the underside of the cutter holder 168 of the third movable cutter 163 and permits its pivoting, again over 120° around the processing axis A. Since the two pivot angles of the first and second movable cutter are added together, in relation to the lowermost stationary cutter the second movable cutter can be pivoted from a position of rest into a operating position of a total of 240° around the processing axis A. Since the upper deflector 151 is arranged, fixed against relative rotation, on the support shaft 167, the deflector wing 152 is located exactly above the blade of the stationary cutter 161.

FIGS. 13 to 17 illustrate a further preferred form of embodiment of a as cutting unit 260 with three cutters 261, 262, 263, in which the second cutter 262 and the third cutter 263 are each pivotable by means of a transition piece 264 over a total of 480° in respect to the cutter 261, 262 located underneath in the direction of the processing axis A. This form of embodiment has proven itself to be particularly suitable if very hard foodstuffs, for example hard vegetables, are to be comminuted. It is made possible in this way that in the course of the first actuation of the cutting unit 260 the full force acts for more than one full revolution only on the first cutter 261 and the second and third cutter 262, 263 are held back because of the inertia of the material to be cut. The second cutter 262 is employed only after more than one revolution, for example over 480°. Accordingly, the third cutter 263 is put actively into rotation after, for example another 480°, i.e. after 960°, in relation to the first cutter 261. FIG. 13a shows the cutting unit 260 in a lateral view with the lower deflector being omitted. FIG. 13b shows the cutting unit 260 in a view from above with the blades in the operating position and spaced apart from each other. The angle φ of approximately 120° drawn in FIG. 13b illustrates, in a view from above, the relative angular position of the blades 164' and 252 to each other, which they assume in their respective operating position. However, to arrive in this position the blade 164' is pivoted over 120° plus a full revolution of 360°, i.e. a total of 480°, in relation to the blade 252.

The cutting unit 260 is designed in such a way that a transition piece 264, a second cutter 262, again a transition piece 264, a third cutter 163 and finally an upper deflector 251 are placed on the first cutter 261 with its support shaft 267. For example, the upper deflector 251 is functionally connected with the support shaft in a manner fixed against relative rotation and fixed in place in the axial direction by means of a cotter pin 253.

Figure 14A:
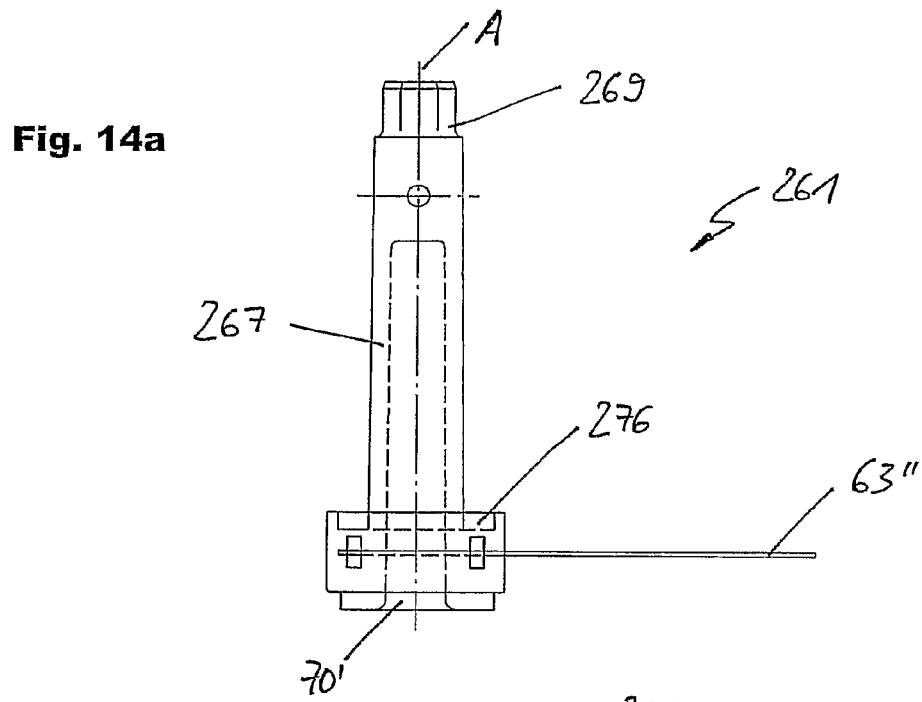
Figure 14B:
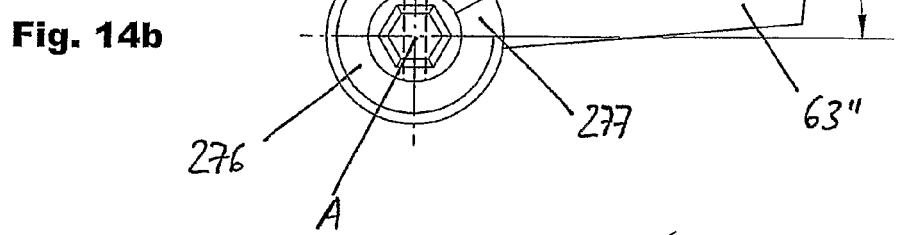
Figure 14C:
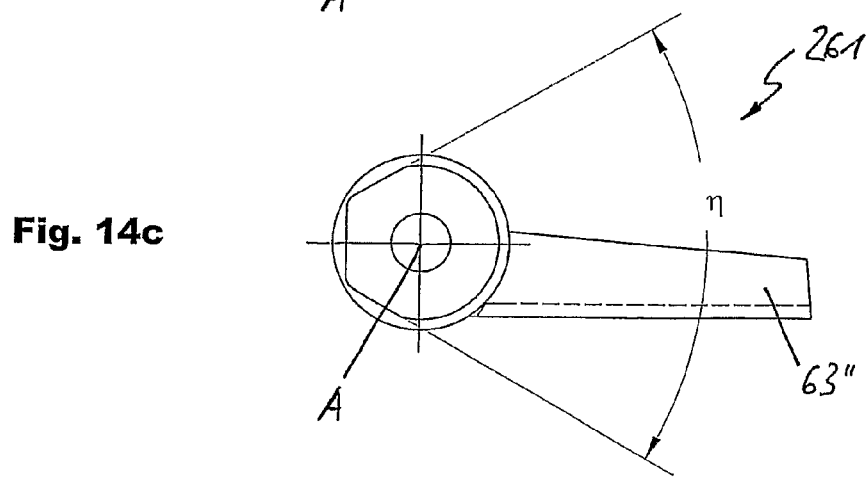

A preferred embodiment form of a first cutter 261 of a cutting unit 260 in accordance with FIG. 13 is represented in FIGS. 14a to 14c. FIG. 14a shows the first cutter 261 in a lateral view, FIG. 14b in a view from above and 14c in a view from below. The upper annular gap 276 in the form of segment of a circle with an upper stop 277 can be clearly discerned in FIG. 14b. This annular gap 276 and the upper stop 277 in the form of segment of a circle, which extends over an angle τ of approximately 30°, work together with a lower radial rib 278 of the transition piece 264 in FIG. 17, which extends over an angle μ of also 30° at the underside of the transition piece.

Figure 15C:
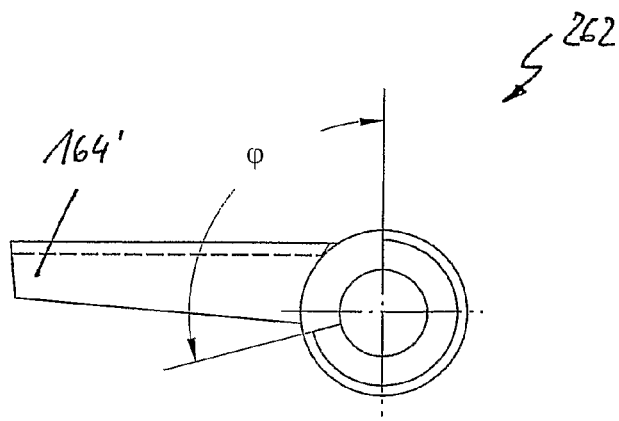
Figure 15A:
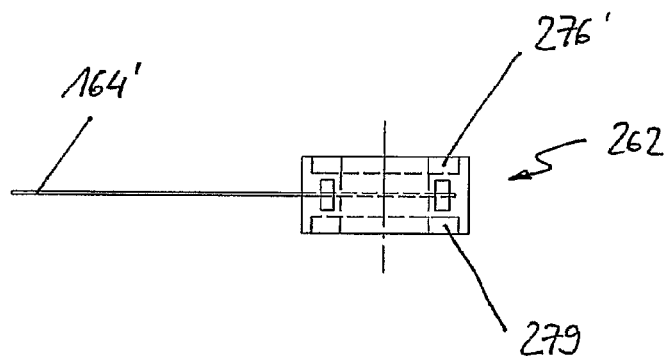
Figure 15B:
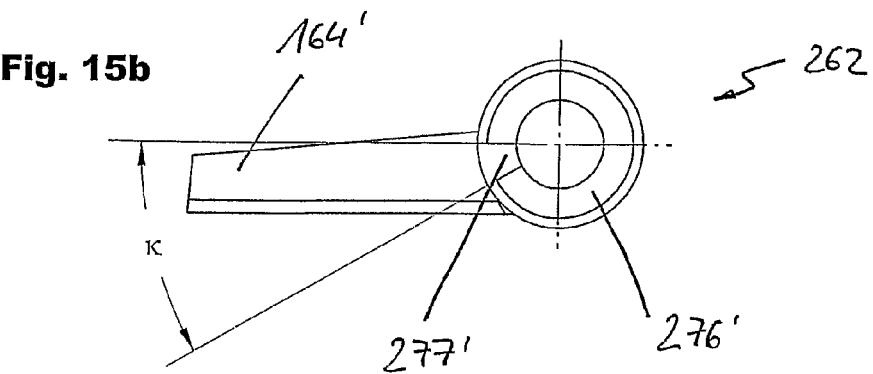

FIGS. 15a to 15c show a second cutter 262 of the cutting unit 260 in accordance with FIG. 13, again in a lateral view, a view from above and a view from below. As can be seen in FIG. 15c, on its underside the second cutter 262 has a lower annular gap 279 with a lower stop 280 at an angle λ of 60°, both of which act together with an upper radial rib 278' of a transition piece 264 in accordance with FIG. 17 at an angle σ of 60°. An upper annular gap 276' with an upper stop 277' similar to the annular gap 276 and the stop 277 of the first cutter 261, which in turn work together with the lower radial lip 278 of a transition piece 264, is embodied on the upper side of the second cutter.

Figure 16C:
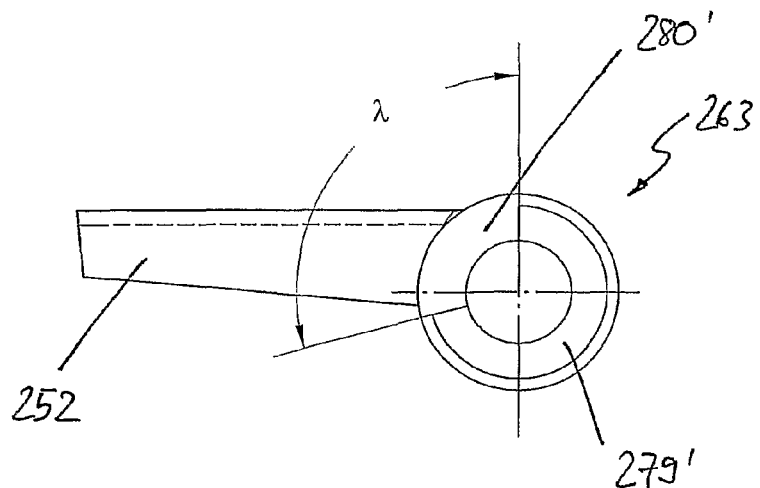
Figure 16A:
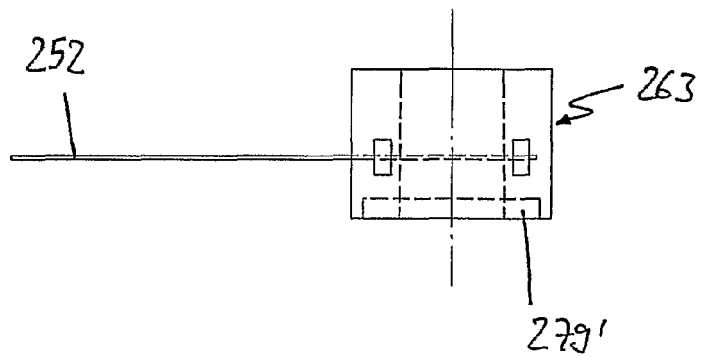
Figure 16B:
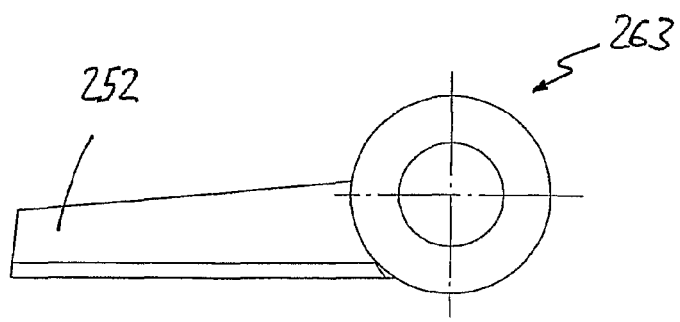

FIGS. 16a to 16c show, in a lateral view, a view from above and a view from below, a third cutter 263 with a cutting unit 260 in accordance with FIG. 13. Again, a lower annular gap 279' and a lower stop 280' are embodied on the bottom of this cutter 263 and work together with an upper radial rib 278' of the transition piece 264.

Figure 17C:
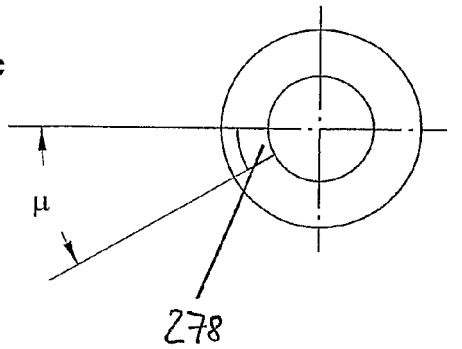
Figure 17A:
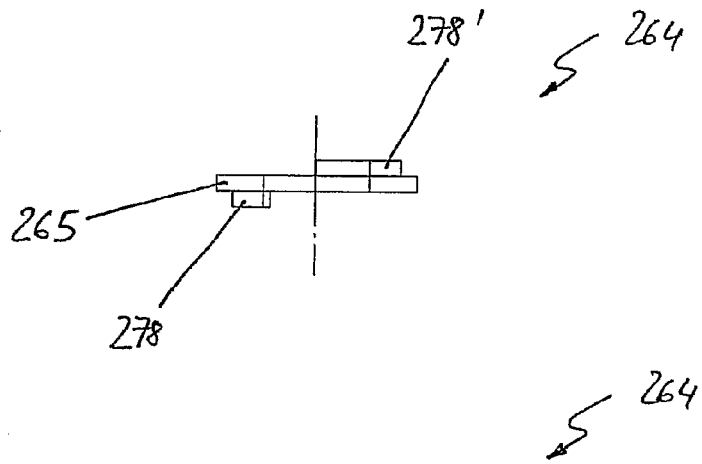
Figure 17B:
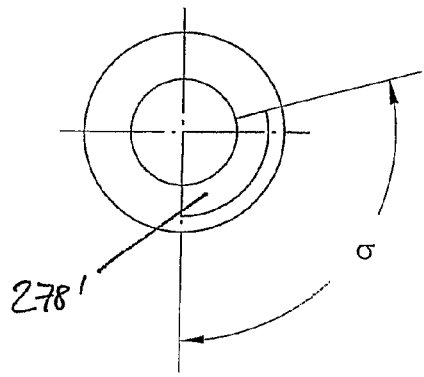

A transition piece 264 of the cutting unit 260 in accordance with FIG. 13 is represented in FIGS. 17a to 17c, wherein FIG. 17a shows the transition piece 264 in a lateral view, FIG. 17b in a view from above and FIG. 17c in a view from below. The transition piece 264 substantially consists of a disk-shaped base 265 with radial ribs 278 and 278' attached to the upper and lower side and is preferably made of the same material from which the holders of the cutters 261, 362, 263 are made.

The first cutter 261 of the cutting unit 260 is directly driven in the known manner described above via its drive cam 269 directly by the drive unit 10, 10'. Now, a transition piece 264 is inserted between the first cutter 261 and the second cutter 262 in such a way that the respective radial ribs 278 and 278' of the transition piece enter into the appropriate annular gaps 276 and 279 of the cutters 261, 262 and work together with the appropriate stops 278 and 280. It has been shown to be advantageous that the second cutter 262 only starts to operate, or respectively rotates along, after a rotation over 480° of the first cutter 261 around the processing axis A. In a preferred embodiment form this free rotation is evenly distributed between the first cutter 261 and the transition piece 264, as well as between the transition piece 264 and the second cutter 262. The rotation over a pivot angle of 240° around the processing axis A between the first cutter 261 and the transition piece 264 can be realized in that the upper stop 277 and the lower radial lip 278 each extend over an angle of 60°. The rotation between the transition piece 264 and the second cutter 262 can be identically realized. It is of course conceivable that the pivot angle for free pivoting of the second cutter in respect to the first cutter can be arbitrarily set by matching the size of the radial ribs and the corresponding annular gap, as well as by the insertion of further transition pieces, if necessary.

A transition piece 264 is also inserted in the same manner between the second cutter 262 and the third cutter 263, so that the third cutter 263 also is given a limited freedom of movement in relation to the second cutter 262. Here, too, pivoting freedom over a pivot angle of 480° has proven to be advantageous and can be attained in the same way as described above.

The pivot angle for free pivoting of the second and third cutters can be arbitrarily set by matching the size of the radial ribs and the corresponding annular gap, as well as by insertion of further transition pieces, if necessary. The distribution of the angles of rotation, or respectively the angular relationship between the radial rib and the stop can be differently designed. It is understood that such variations are possible without departing from the spirit of the invention.

Since the inertia of the material to be processed, for example of the material to be cut, acts on the whole portions of the material to be cut as well as on the portions already comminuted by the processing means, so that they are more likely to stay in the vicinity of the bottom 31 of the processing container 30, 130 than near the base 21, 21', 121 of the top part 2, 2', 102, the processing means, in particular the blades 63", 164', 262—viewed in the direction of the processing axis A—are arranged nearer to the lower end of the processing unit 260 than to the oppositely located upper end 269 of the processing unit 260.

In further preferred embodiments it is also possible to arrange more than one blade in one blade holder, wherein these can again be positioned in the same angular position or offset from each other on the same angled holder. The geometry of the blades and their angle of attack at the blade holder will also be varied and optimized for the respective use. Since the cutting insert 60 of the devices in accordance with the invention can be easily changed, it has been shown to be advantageous to offer different cutting or processing units. Besides the already described cutting units for cutting vegetables and fruit, nuts or chocolate, it is also possible to employ and offer those with very narrow thin blades for cutting herbs, and those with solid blades and serrated cutting edges for crushing ice.

In place of blades, finger-shaped processing means are employed for peeling onions and/or garlic, such as are known from devices in accordance with the species. Processing units for cutting and for squeezing are combined with each other in one unit for processing of soft or pre-cooked vegetables and/or fruit, in particular for preparing food for small children and babies.

The devices in accordance with the invention can be employed in many ways in the kitchen or household with further inserts which are arranged in the lower part in place of the cutting insert and can be put into rotation by means of the drive unit, for example a basket for centrifuging herbs, an S-shaped mixing arm, or a beater for frothing milk.

The processing container designed as a container for material to be cut which, in embodiments described up to now, had been shown to be substantially rotationally round and with its diameter tapering downward, can be simply exchanged and adapted to the respective purpose of use. The container for the material to be processed and containing the finished processed material can be closed off by a separate cover and stored. To this end the cutting insert or other processing insert is removed. With a second container for material to be cut the device in accordance with the invention is again ready for use.

In accordance with preferred embodiments, such as represented in the drawing figures, the bottom of the container for the material to be cut has a central, upwardly projecting bearing journal. The cylindrical journal is used as an abutment for the shaft with the processing means and is provided with a corresponding cylindrical cutout for receiving the bearing journal. Without departing from the idea of the invention, the bottom of the container for the material to be cut, or processing container, can also be provided with a reception opening, into which a corresponding journal on the shaft, or the shaft itself, can be introduced.

Because the shaft is preferably seated at both ends, the stability of the structure is decisively increased, and the volume of the container for the material to be cut, or processing container, and therefore the amount of fill which can be effectively processed, can be substantially increased in comparison with known small manual devices.

In accordance with further forms of embodiment of the invention, the lower seating of the shaft is omitted, so that the container for the material to be cut, or processing container, need not have a journal or other means for seating the shaft. In this case the upper seating of the processing or cutting unit is designed in such a way that the processing or cutting unit can be releasably fastened, torque proof and solidly in the axial direction on the corresponding means of the engagement member. This can be accomplished by means of the known bayonet coupling, for example.

Figure 18A:
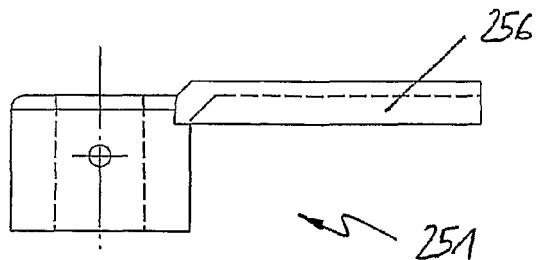
Figure 18B:
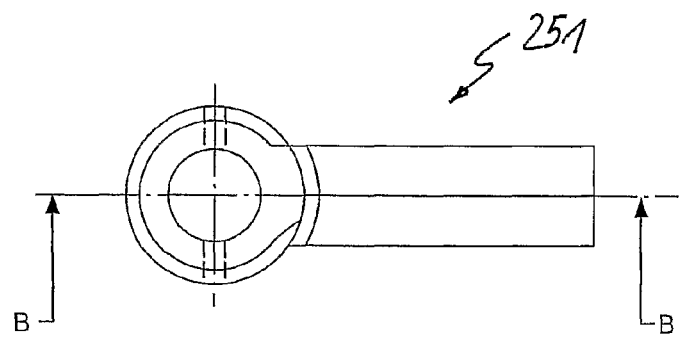
Figure 18C:
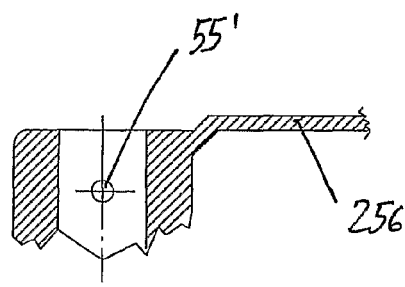
Figure 18D:
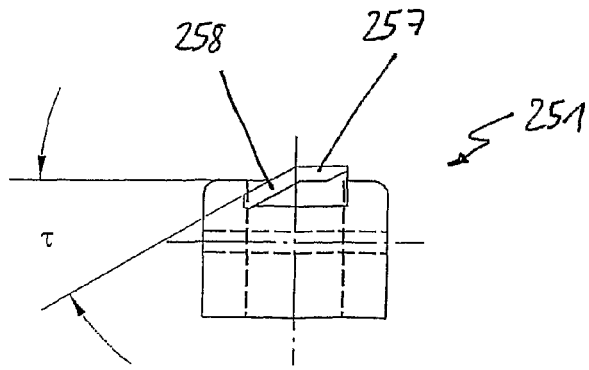

A lateral view, a view from below and above of an upper deflector 251 in accordance with FIG. 13, and a sectional view along the line B-B in FIG. 18*b* are respectively shown in FIGS. 18*a* to 18*d*. Differing from the deflector represented in FIG. 4, a deflector wing of the deflector 251 represented in FIG. 13 is displaced in the direction of the processing axis A further in the direction of the upper end, or respectively the drive cam 269, so that some kind of a knee is created (see FIG. 18*c*). By such an arrangement of the deflector wing 256 it is possible to achieve that, when employing this cutting unit 260 in a device 10, 10', a dead zone in respect to the effective area between the upper deflector wing 256 and the underside of the cover base 21, 21', 121 is further reduced. Because of this, a lesser amount of processed material sticks to the underside of the cover base and instead is returned into the effective range of the processing means—in this form of embodiment the processing unit 260 of the blades 163', 164' and 252. In this form of embodiment of the upper deflector 251, a horizontal segment 257 and a deflector segment 258 are designed similar to those in FIG. 4*b*. An angle of inclination τ between the horizontal segment 257 and the deflector segment 258 is represented in FIG. 18*d* at approximately 30°. The angle of inclination τ lies between 0° and 90°, preferably between 10° and 60°, in accordance with FIG. 18*d* at approximately 30°.

As suggested in FIGS. 1 and 6, the device in accordance with the instant invention is driven manually, for example by a cord pull. The length of the cord pull has been selected to be 400 to 750 mm, preferably 600 mm, in such a way that, with a corresponding diameter of the winder, the winder rotates 3 to 6 times, preferably 4 to 5 times, per pull (until complete unwinding). While in the exemplary embodiment of FIG. 1 the rotating movement of the cord winder is transmitted 1:1 to the cutting unit, a device 1' with a drive unit 10' with a gear is represented in FIGS. 6*a* and 6*b*. The cord roll or winder 12' is seated on a shaft 9', which extends eccentrically in respect to the device axis, or processing axis A and is arranged on the cover, and is manufactured in one piece with a spring housing 7' located above it and a drive wheel 14' located below it. The eccentrically arranged drive wheel 14' is provided with internal teeth 15', which mesh with the external teeth 16' of an axial wheel 17', which is seated concentrically on the top part 2'. The gear ratio in the exemplary embodiment represented is 1:1.8, and a gear ratio of up to 1:4 has proven itself to be advantageous. The axial wheel 17' is seated on a generator wheel 18', which is considerably larger in diameter than the axial wheel and via external teeth drives a running wheel 44' with a large gear ratio of, for example 1:15, of a generator 45' peripherally arranged in the top part. The generator 45' supplies an electronic unit 47' and a display unit 40' attached to the cover with electrical current, but the respective current-carrying lines are not represented in the drawings. Preferably the electronic unit including the generator is arranged on a base plate 46', which can be fastened on appropriate nipples at the bottom 29' of the base 21'. For simpler embodiment forms of the device without a cutting degree indicator, the base plate of the generator and the electronic unit are simply omitted during production, and the reception opening for the display unit is closed off by means of an appropriate insert. Thus, both device variations can be produced by use of the same injection molding parts, which has a quite advantageous effect on production costs.

The electronic unit 47' and the display unit 40' are components of a cutting degree indicator which, in accordance with the instant invention, makes it simple even for untrained users to obtain cut material of an ideal cutting degree. The display unit 40' is arranged in a cutout in the cover 20', as shown in FIGS. 6*b* and 6*e*, for example, and can be easily viewed by the user. The position above the cutout for the handle 11' has shown itself to be advantageous, since in use it remains facing the user and is not covered by the hand of the user with which the device is held. The cutting degree indicator, in particular its display unit 40', is advantageously constructed in a very simple manner and can be intuitively understood by the user without further instruction. Accordingly, in the exemplary embodiment in FIG. 6e, a display unit in the form of three light-emitting diodes 41', 42', 43' has been inserted, easily visible to the user, into the cover. The three LED's in the colors green, yellow and red are arranged in a line next to each other. For detecting the number of revolutions of the processing unit, for example the cutting unit 60' and therefore of the blades 61', 62', the number of revolutions of the running wheel is detected by the electronic device and stored intermediately. As soon as the intermediately stored value exceeds a preselected value (for example five blade revolutions), the green LED of the display is illuminated or blinks. By this it is indicated to the user that, although the material to be cut has been evenly comminuted, it is still rather coarse. The green LED is illuminated or blinks, preferably fed by a capacitor, as long as the cumulative number of revolutions lies below a preselected value. The cutting unit is further rotated by further pulls on the cord pull and, after exceeding MM revolutions, the display unit changes from green to yellow, i.e. the yellow LED is triggered and the green one switched off. In this way a signal is provided to the user that now the material to be cut is finely cut and, after approximately MM further pulls, the display changes into the red range, i.e. the red LED is illuminated or blinks instead of the yellow one. In this way the user is provided with the information that the material to be cut is now present in a very finely comminuted way and further processing would only result in finely pureed cut material. In accordance with a preferred embodiment, the green LED is active between 0 to 7 revolutions, the yellow one between 8 and 14, and the red one starting at 15.

It is alternatively also possible to select the sequence yellow, green and red of the LED colors, so that still rough material to be cut is signaled by yellow to the user, finer material to be cut by the green LED and very fine cut material, or puree, by red light. In a further form of embodiment, a low-consumption LCD display is provided in place of the LEDs, in which the increasing fineness of the material to be cut, or further processing progress, is symbolized by increasing bars, for example.

Since it is not desired to provide the device for foodstuff processing with a battery, the electrical current required for operating the electronic cutting degree indicator is preferably generated by the above mentioned generator, which is operated by means of the rotating movement during cutting or processing. The voltage provided by the generator is rectified and is used for charging of a storage capacitor. The downstream connected electronic device and the display unit are provided with energy from this storage capacitor. The electrical current consumption by the electronic device and the display unit is so low that the user practically does not notice the mechanical resistance generated by the dynamo. To further reduce the electrical current consumption it is possible to operate the LEDs in a blinking mode. In order to be able to omit additional operating elements and components connected therewith, the electronic device switches off the display a few seconds after the stop of the drive unit and returns the counter to zero.

After the desired degree of fineness has been reached, the user stops the drive mechanism and the cord is rewound by means of the pre-wound spring until the handle comes to rest again in the position of rest provided on the cover. The top part can be removed from the container for the material to be cut, and the finished material can be removed or stored in the container.

The technical teaching in regard to the cutting degree indicator can also be advantageously transferred to other manually operated kitchen utensils in which a desired degree of processing is correlated with a defined number of processing steps, preferably with revolutions of a drive or processing unit.

In the course of extensive tests it has been shown to be extremely advantageous for achieving a homogeneous cutting result to attach deflectors 50, 51 below and/or above the blades, which cause the material to be cut to be flung again and again within the range of the cutter blades. As represented in the exemplary embodiment of FIGS. 1, 6 and 12, a lower 50, 50' and an upper deflector 51, 151 are preferably provided for the novel cutting device, wherein, as already previously described, the upper deflector is preferably arranged in the same radial angular position as the stationary blade, and the lower deflector is mounted in a 180° position located opposite the stationary blade. Upper deflectors 51, 151 (FIGS. 4, 10) and a lower deflector 50 (FIG. 5) are represented in FIGS. 4, 5 and 10, which are preferably employed in the device in accordance with FIG. 1. While the upper deflector 51, 151 is preferably fixedly connected with the support shaft 167, a ring 59 of the lower deflector 50 has been attached, in positive manner and fixed against relative rotation to the bottom of the blade holder 65. The radially projecting deflector wing 56, 156 includes, viewed in the direction P of rotation, a front horizontal segment 57, 157 and a successive deflector segment 58, projecting upward at an angle. Material to be cut, which impinges on the radially rotating deflector segments 58, 58' 158, is flung upward by it into the active area of the blades, which has an extremely positive effect on the cutting result, in particular in connection with light materials to be cut, such as parsley or other herbs. The upper deflector wing 51, 151 acts analogously to this by again flinging the material to be cut, which had been flung upward, with its deflector segments 58', 158 downward into the area of the cutters, respectively the blades. The upper deflection wing prevents that still coarse pieces of the material to be cut "remain" between the upper blade and below the inner bottom of the top part, or adhere there. This might be possible, since the material to be cut is given buoyancy as a result of the high rate of rotation of the cutting unit and therefore "remains" outside of the vertical cutting range defined by the blades. The upper deflection wing prevents this by returning these not yet comminuted pieces back into the cutting range and by means of this sees to a substantially more regular material to be cut.

The lower deflection wing acts as a buoyancy wing. It assists in seeing that lightweight material to be cut, i.e. herbs, leaves, etc., do not adhere to the bottom of the container, in particular if these are processed while moist. The material to be cut is constantly transported upward again into the cutting range by constant buoyancy. Therefore the lower deflector is not fixedly connected with the support shaft, but instead is placed by the user on the support shaft below the lowermost stationary cutter blade when required.

In tests with devices of the same species with rotating cutting units with stationary blades, the above described deflectors in accordance with the invention have affected the cutting results in an extremely positive manner. The processing or cutting units, which rotate around a vertical axis of rotation, of known devices with manual or electric drive mechanisms can be provided with a lower and/or upper deflector, which are arranged releasably or fixed in place on suitable parts of the cutting units.

LIST OF REFERENCE NUMERALS 1, 1', 100 Device
2, 2', 102 Top part
3, 103 Lower part
5 Recess for handle
6 Feed-through opening
7, 7' Spring housing
8, 8' Cover shaft
9' Eccentric shaft
10, 10' Drive unit
11' Handle
12, 12' Winder/cord roll
13' Opening
14' Drive wheel
15' Internal teeth
16' External teeth
17' Axial wheel
18' Generator wheel
19' Axial wheel hub
20, 20' Cover
21, 21', 121 Base
22, 22' Coupling (male portion)
23, 23' Engagement member
24' Drive cam
25' Bearing cup
26' Bearing journal
27' Bearing washers
28, 28' Lateral wall base
29', 129 Bottom base
30, 130 Processing container
31 Bottom
32, 32' Lateral wall
33, 33' Bearing journal
34, 34' Rib
35' Slipping guard
40' Display unit
41' First LED
42' Second LED
43' Third LED
44, 44' Running wheel
45' Generator
46, 46' Base plate
47, 47' Electronic unit
50, 50' Lower deflector
51,51',151,251 Upper deflector
52, 52' Holder
53, 53' 253 Cotter pin
54, 54' Plug-in opening
55, 55' Cotter pin hole
56,56',156,256 Deflector wing
57,57',157,257 Horizontal segment
58,58',158,258 Deflector segment
59 Ring
60, 160, 260 Processing unit
61,61',161,261 First cutter
62,62',162,262 Second cutter, first movable cutter
63, 63', 63" First blade
64,64',164,146' Second blade
65, 65', 165 First blade holder
66, 66', 166 Second blade holder
67,67',167,267 Support shaft
68 Cotter pin hole
69, 169, 269 Drive cam
70, 70' Bearing opening
71, 71', 171 Reception opening
72, 172 Radial rib
73 Front stop face
74 Rear stop face
75 Apron
76 Annular gap
77, 177 Stop
78 Front stop face
79 Rear stop face
153 Holder
163, 263 Third cutter, second movable cutter
252 Third blade
264 Transition piece
265 Base
168 Holder
170 Radial rib
178 Stop
276, 276' Upper annular gap
277, 277' Upper stop
278, 278' Radial rib
279, 279' Lower annular gap
280, 280' Lower stop

What is claimed is:

1. A processing unit for a device for processing foodstuffs, comprising:
at least two processing means arranged along a processing axis, the processing axis defined by a support shaft, the at least two processing means acting in the circumferential direction of the processing axis, wherein at least one processing means is pivotable about the processing axis in relation to at least one further processing means within a limited pivot angle,
the at least two processing means operably connected to a single drive element and configured to be rotated by the single drive element.

2. The processing unit in accordance with claim 1, wherein the processing means is at least one selected from the group consisting of blades for cutting, blades for squeezing, fingers for kneading, fingers for cutting, and beaters for foaming.

3. The processing unit in accordance with claim 2, wherein it is designed as a cutting unit and at least one first blade is arranged, fixed against relative rotation with respect to the support shaft on the support shaft, and at least one second blade is pivotable over 180°, around the common processing axis out of a position of rest relative to the first blade into a cutting position.

4. The processing unit in accordance with claim 2, wherein it is designed as a cutting unit and that at least one first blade is arranged, fixed against relative rotation with respect to the support shaft on the support shaft, and at least one second blade is pivotable over 120°, around the common processing axis out of a position of rest relative to the first blade into a cutting position, and at least one third blade is pivotable over 240°, around the common processing axis out of a position of rest into a cutting position.

5. The processing unit in accordance with claim 2, wherein it is designed as a cutting unit and that a transition piece is arranged at least between a first blade and a second blade in such a way that the pivot angle of the second blade has been increased to more than 360° in respect to the first blade.

6. The processing unit in accordance with claim 2, wherein it is designed as a cutting unit and at least one first blade is arranged, fixed against relative rotation with respect to the support shaft on the support shaft, and at least one second blade is pivotable over 480°, in relation to the first blade out of a position of rest around the common processing axis into a cutting position, and at least one third blade is pivotable over 960°, in relation to the first blade out of a position of rest around the common processing axis into a cutting position.

7. The processing unit in accordance with claim 3, wherein all blades are arranged in their respective positions of rest located one above the other, viewed in the direction of the processing axis.

8. The processing unit in accordance with claim 3, wherein the blades are substantially arranged radially in relation to the processing axis.

9. The processing unit in accordance with claim 1, wherein a deflector, respectively having at least one deflector wing acting in the circumferential direction of the processing axis is arranged above or below the processing means, which in the course of the operation of the processing unit rotate along with the support shaft in order to return the material to be processed, which is flung upward or downward out of the active area of the processing means during the rotation of the processing unit around the processing axis back into this active area.

10. The processing unit in accordance with claim 9, wherein the deflector is substantially oriented radially to the processing axis.

11. The processing unit in accordance with claim 9, wherein a lower deflector is fastened, fixed in place torque proof and releasably, to a lower end of the support shaft, viewed in the direction of the processing axis, of the processing unit.

12. The processing unit in accordance with claim 1, wherein the processing means are arranged axially offset in the direction of the processing axis.

13. The processing unit in accordance with claim 3, wherein the blades, viewed in the direction of the processing axis, are arranged closer to the lower end of the processing unit than to the oppositely located upper end of the processing unit.

14. A device for processing foodstuffs, having a top part, a drive unit, a lower part with a processing container and a processing unit, which is driven by means of the drive unit, wherein the processing unit is a processing unit in accordance with claim 1.

15. The device in accordance with claim 14, wherein the drive unit is manually or electrically driven.

16. The device in accordance with claim 14 wherein the drive unit and the processing unit are operatively connected with each other by means of a torque proof releasable connection.

17. The device in accordance with claim 14, wherein the drive unit comprises at least one of a crank drive and a cord pull drive.

18. The device in accordance with claim 17, wherein a winder, is rotated by pulling on a pull cord of the cord pull drive, is in an operative connection via a gear with an engagement member in such a way that a resulting rpm gear ratio amounts to more than 1, preferably 1.8 to 1.9.

19. The device in accordance with claim 18, wherein the winder is seated torque proof and rotatably, by means of a drive wheel on a cover shaft, which extends eccentrically in relation to the processing axis and projects away from the inside of a cover of the top part, and the rotating movement of the drive wheel is transmitted to an axial wheel, which is arranged coaxially extending in respect to the processing axis.

20. The device in accordance with claim 19, wherein internal teeth of the drive wheel engage with external teeth of the axial wheel.

21. The device in accordance with claim 14, wherein the processing container is a substantially rotation-symmetrical vessel for receiving material to be processed, and the processing unit is rotatably seated in the processing container.

22. The device in accordance with claim 14, wherein, viewed in the direction of the processing axis, the processing unit has an upper end, which is in a torque proof operative connection with the drive unit, as well as a lower end facing away from the upper end, which is rotatably seated on the bottom of the processing container.

23. The device in accordance with claim 14, wherein a desired degree of processing of the foodstuffs is correlated with a defined number of processing steps, with a defined number of revolutions of the drive unit, or respectively of the processing unit, that the degree of processing is detected by means of an electronic unit and is displayed to the user of the device by means of a display unit.

24. The device in accordance with claim 23, wherein the electronic unit and the display unit can be provided with electrical current by a generator which is driven by one of the drive unit and the processing unit.

25. The device in accordance with claim 23 wherein the display unit includes three light-emitting diodes in different colors, preferably green, yellow and red.

26. A processing unit for a device for processing foodstuffs, comprising:
at least two processing means arranged along a processing axis, the processing axis defined by a support shaft, the at least two processing means acting in the circumferential direction of the processing axis, wherein at least one processing means is pivotable about the processing axis in relation to at least one further processing means within a limited pivot angle, at least one pivot element connected to the processing means and configured to limit pivoting of the at least one processing means within the limited pivot angle.

* * * * *

UNITED STATES PATENT AND TRADEMARK OFFICE
CERTIFICATE OF CORRECTION

PATENT NO.         : 8,635,948 B2                                            Page 1 of 1
APPLICATION NO.    : 12/299436
DATED              : January 28, 2014
INVENTOR(S)        : Bruno Herren It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this
Twenty-second Day of September, 2015

Michelle K. Lee
*Director of the United States Patent and Trademark Office*